United States Patent
Iseri et al.

(10) Patent No.: US 7,019,933 B2
(45) Date of Patent: Mar. 28, 2006

(54) SERVO INFORMATION WRITE METHOD, SERVO CONTROL METHOD, DATA STORAGE DEVICE, AND PROGRAM

(75) Inventors: Kaoru Iseri, Fujisawa (JP); Takashi Kuroda, Chigasaki (JP); Nobuya Matsubara, Fujisawa (JP); Kenji Ogasawara, Fujisawa (JP); Fuminori Sai, Yokohama (JP); Hiroshi Yanagisawa, Kamakura (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 66 days.

(21) Appl. No.: 10/676,410

(22) Filed: Sep. 30, 2003

(65) Prior Publication Data

US 2004/0125491 A1 Jul. 1, 2004

(30) Foreign Application Priority Data

Nov. 29, 2002 (JP) .............................. 2002-348795

(51) Int. Cl.
*G11B 21/02* (2006.01)

(52) U.S. Cl. .......................................... 360/75; 360/51

(58) Field of Classification Search ................ 360/48, 360/49, 51, 53, 75, 76, 77.01, 77.02, 77.06, 360/78.01, 78.04, 78.06, 78.08
See application file for complete search history.

(56) References Cited

U.S. PATENT DOCUMENTS 5,612,833 A * 3/1997 Yarmchuk et al. ............ 360/75
6,707,632 B1 * 3/2004 Raphael et al. .............. 360/75

FOREIGN PATENT DOCUMENTS

JP 2002008331 A 1/2002

* cited by examiner

*Primary Examiner*—David Hudspeth
*Assistant Examiner*—Jason Olson
(74) *Attorney, Agent, or Firm*—Ronald B. Feece; Lewis L. Nunnelley; Steven J. Cahill

(57) ABSTRACT

A servo system wherein a read head R detects a servo pattern that is written on a magnetic disk by a write head W. Position control of the write head W is exercised in accordance with the detected servo pattern, and the read head R detects a propagation pattern that is written on the magnetic disk by the write head W. Position of the write head W is corrected in accordance with the detected propagation pattern.

24 Claims, 18 Drawing Sheets

SERVO INFORMATION WRITE METHOD, SERVO CONTROL METHOD, DATA STORAGE DEVICE, AND PROGRAM

FIELD OF THE INVENTION

The present invention relates to a servo information write method, servo control method, data storage device, and program for a storage medium, and more particularly to a servo information self-write method, servo control method, data storage device, and program.

BACKGROUND OF THE INVENTION

Hard disk drives, which are widely used as a data storage device for computers and like devices, include a magnetic head for reading user data stored on a magnetic disk or writing user data onto a magnetic disk. The magnetic head is mounted on an actuator that is oscillated by a VCM (voice coil motor). When the magnetic head reads or writes user data, the actuator is driven to move the magnetic head to a specific track (target track) for positioning purposes. Magnetic head positioning control is exercised in accordance with servo information stored on a magnetic disk to move the magnetic head to a specified position. In line with recording density improvement, hard disk drives released in recent years have begun to use an MR (magnetoresistive) head, GMR (giant magnetoresistive) head, or other magnetoresistive device, which produces a magnetoresistive effect, as a read-only read head, and a transducer induction head as a write-only write head. These two heads, which constitute a composite magnetic head, are mounted on the same support called a slider, but positioned at a predetermined distance from each other. The slider is mounted on the actuator.

A plurality of data tracks are concentrically formed on a hard disk or other magnetic disk. Further, servo tracks, which store identification information and burst patterns beforehand, are formed in the radial direction of a magnetic disk. The aforementioned servo information comprises the identification information and burst patterns. The identification information indicates the track address of a data track. The identification information acquired by the read head is used to determine the data track on which the read head or write head is positioned. As the burst patterns, a plurality of burst pattern rows, which differ in signal storage area phase, are employed so that various signal storage areas are arranged at fixed spacing intervals and in the radial direction of a magnetic disk. In accordance with a signal (PES: position error signal) that is generated by the read head depending on the burst patterns, the deviation of the read head or write head from the target data track can be detected.

The servo information is written onto a magnetic disk in a manufacturing process that is performed prior to hard disk drive shipment as a product. For an accurate read/write of user data, the servo information, which serves as the reference, needs to be accurately written. Conventionally, a dedicated device called an STW (servo track writer) was used to write servo information onto a magnetic disk. The STW writes servo information onto a magnetic disk while controlling the feed pitch (write position in the radial direction of a magnetic disk) of a magnetic head (write head) for writing servo data at a track pitch (distance between the centers of adjacent tracks) and the timing with which servo information is to be written (write position in the circumferential direction of a magnetic disk). A known method for setting the magnetic head's feed pitch is to determine the absolute position of the magnetic head (write head) by pressing a push pin against the actuator on which the magnetic head is mounted. A known method for setting the servo data write timing is to write clock data onto the outer area of the magnetic disk by using a dedicated clock head and use the written clock data as the reference clock.

However, the use of the above methods makes it necessary to write clock data onto a magnetic disk with the clock head or press the push pin against the actuator. It means that the hard disk drive needs to be uncovered for a servo information write. Therefore, the use of the above methods imposes a restriction that the servo information write must be performed within a clean room.

Under these circumstances, the inventors of the present invention proposed a method for performing a servo information self-write without using the aforementioned clock head or push pin (refer to Patent Document 1). This proposed method makes it possible to write servo information onto a magnetic disk outside a clean room and without having to uncover the hard disk drive.

[Patent Document 1]

Japanese Patent Laid Open No. 2002-8331

For servo information write purposes, the self servo write method disclosed by Patent Document 1 writes a special servo pattern, which is called a propagation pattern, onto a data track in addition to servo information, and reads such a propagation pattern to exercise servo control.

However, propagation-pattern-based servo control differs from common servo control for a hard disk drive. Processing required for propagation-pattern-based servo control cannot be completed by using a hard disk controller (HDC) and MPU (microprocessing unit) built in a hard disk drive as well as software. In general, it is necessary to connect an STW that is dedicated to a self servo write and provided with a powerful processor and software.

SUMMARY OF THE INVENTION

The present invention is made to solve the foregoing technical problems, and has for its object to perform a self servo write by using the hardware included in a data storage device while no pattern is stored in a disk-type storage medium.

It is a further object of the present invention to enhance the head positioning control accuracy.

The present invention proposes positioning a magnetic head and performing a self servo write in accordance with a servo pattern written on a disk-type storage medium instead of a propagation pattern written on a disk-type storage medium. The present invention also proposes enhancing the head positioning accuracy by making corrections in accordance with the propagation pattern.

More specifically, the servo information write method of the present invention comprises two steps. The first step positions an actuator on which a composite head containing a read head and a write head is mounted while the actuator is in contact with a crash stop, and causes the write head to write a servo pattern and a propagation pattern onto a disk-type storage medium. The second step is performed, when the servo pattern written on the disk-type storage medium by the write head can be detected by the read head, in order to position the write head by means of servo control based on the detected servo pattern and cause the write head to further write a servo pattern and a propagation pattern onto the disk-type storage medium.

The first step for the above servo information write method varies the amount of current flow to a drive motor for the actuator while the actuator is in contact with the crash stop. The second step causes the read head to detect the propagation pattern written on the disk-type storage medium and corrects the position of the write head in accordance with the detected propagation pattern.

The above servo information write method further comprises the step of determining a feed pitch for writing a trigger pattern onto the disk-type storage medium. The servo information write method further comprises the step of determining a write time interval between the instant at which the read head detects the trigger pattern written on the disk-type storage medium and the instant at which the write head writes the next trigger pattern onto the disk-type storage medium. The write time interval determination step uses a read/write offset which is the distance between the read head and write head, and causes the read head to detect the time difference between trigger patterns written onto radially adjacent tracks of the disk-type storage medium.

The servo information write method of the present invention writes servo information onto a disk-type storage medium by using a composite head containing a read head and a write head. This servo information write method comprises the step of writing, by the write head, a trigger pattern, a servo pattern, and a propagation pattern onto the disk-type storage medium, and the step of detecting, by the read head, the servo pattern written on the disk-type storage medium and positioning the write head at the next write position in accordance with the detected servo pattern.

This servo information write method further comprises the step of detecting, by the read head, the propagation pattern written on the disk-type storage medium, and correcting the position of the write head in accordance with the detected propagation pattern. The trigger pattern and servo pattern are to be written into a position information storage area of the disk-type storage medium, and the propagation pattern is to be written into a data storage area of the disk-type storage medium.

Further, the present invention proposes adjusting the servo information write position and write timing by using a trigger pattern written on a disk-type storage medium.

More specifically, the servo information write method of the present invention writes servo information onto a disk-type storage medium by using a composite head containing a read head and a write head. This servo information write method comprises the step of writing, by the write head, a trigger pattern onto the disk-type storage medium, and the step of determining a write time interval between the instant at which the read head detects the trigger pattern written on the disk-type storage medium and the instant at which the write head writes the next trigger pattern onto the disk-type storage medium.

The write time interval determination step for the above servo information write method uses a read/write offset between the read head and write head. Further, the write time interval determination step causes the read head to detect the time difference between trigger patterns written onto radially adjacent tracks of the disk-type storage medium.

The present invention also proposes controlling the positions of a read head and a write head with increased accuracy by establishing the correlation between a position error signal, which is obtained by reading a servo pattern, and the positions of the read head and write head.

More specifically, the servo control method of the present invention positions a composite head containing a read head and a write head at a specified position on a disk-type storage medium. This servo control method comprises two steps. The first step causes the read head to detect a servo pattern written on the disk-type storage medium. The second step converts a position error signal of the detected servo pattern into a physical position on the disk-type storage medium.

The second step for the above servo control method uses a read/write offset which is the distance between the read head and the write head. Further, this second step causes the write head to write a measurement pattern at a position other than the position for the servo pattern on the disk-type storage medium, causes the read head to detect a profile of the measurement pattern written on the disk-type storage medium, and linearizes the relationship between the position error signal and the read head position in accordance with the detected measurement pattern.

The data storage device of the present invention comprises two servo first means. The first servo write means positions an actuator on which a composite head containing a read head and a write head is mounted while the actuator is in contact with a crash stop, and causes the write head to write a servo pattern and a propagation pattern onto a disk-type storage medium. The second servo write means positions, when the servo pattern written on the disk-type storage medium by the write head can be detected by the read head, the write head by means of servo control based on the detected servo pattern and causes the write head to further write a servo pattern and a propagation pattern onto the disk-type storage medium.

This data storage device further comprises a correction means. While the second servo write means is writing a servo pattern and a propagation pattern, the correction means causes the read head to detect the propagation pattern written on the disk-type storage medium and corrects the position of the write head in accordance with the detected propagation pattern.

The data storage device of the present invention also comprises a write means for causing the write head to write a trigger pattern onto a disk-type storage medium, and a determination means for determining a write time interval between the instant at which the read head detects the trigger pattern written on the disk-type storage medium and the instant at which the write head writes the next trigger pattern onto the disk-type storage medium.

The determination means of the above data storage device uses a read/write offset between the read head and write head. Further, this determination means causes the read head to detect the time difference between trigger patterns written onto radially adjacent tracks of the disk-type storage medium.

Further, the data storage device of the present invention comprises a disk-type storage medium which is positioned in a revolvable manner and provided with a surface storing a servo pattern, a read head which is positioned so as to be capable of reading the servo pattern, a converter for converting a position error signal of the servo pattern read by the read head into a physical position on the disk-type storage medium, and a controller for controlling the position of the read head in accordance with the conversion result produced by the converter.

The above data storage device further comprises a write head which is positioned at a predetermined distance from the read head and used to write data onto the disk-type storage medium. The write head also writes the servo pattern. The read head consists of a magnetoresistive device, whereas the write head consists of a transducer induction device.

Furthermore, the present invention provides a program that implements the functions for performing various steps of the prevent invention described above.

DETAILED DESCRIPTION OF THE PREFERRED EMBODIMENTS

The embodiments of the present invention will now be described in detail with reference to the accompanying drawings.

Figure 1:
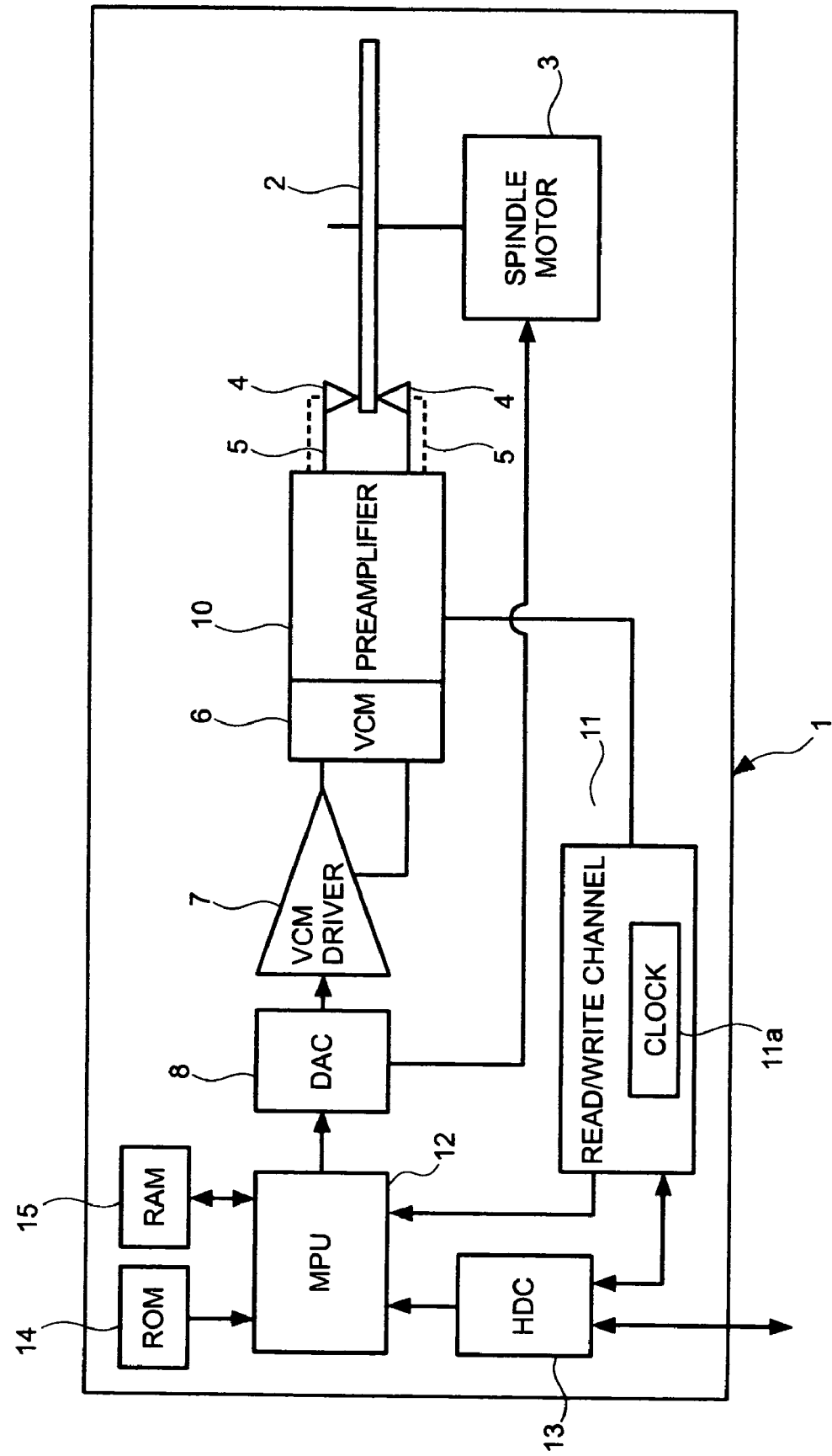
FIG. 1 is a block diagram that illustrates major components of a hard disk drive.
Figure 2:
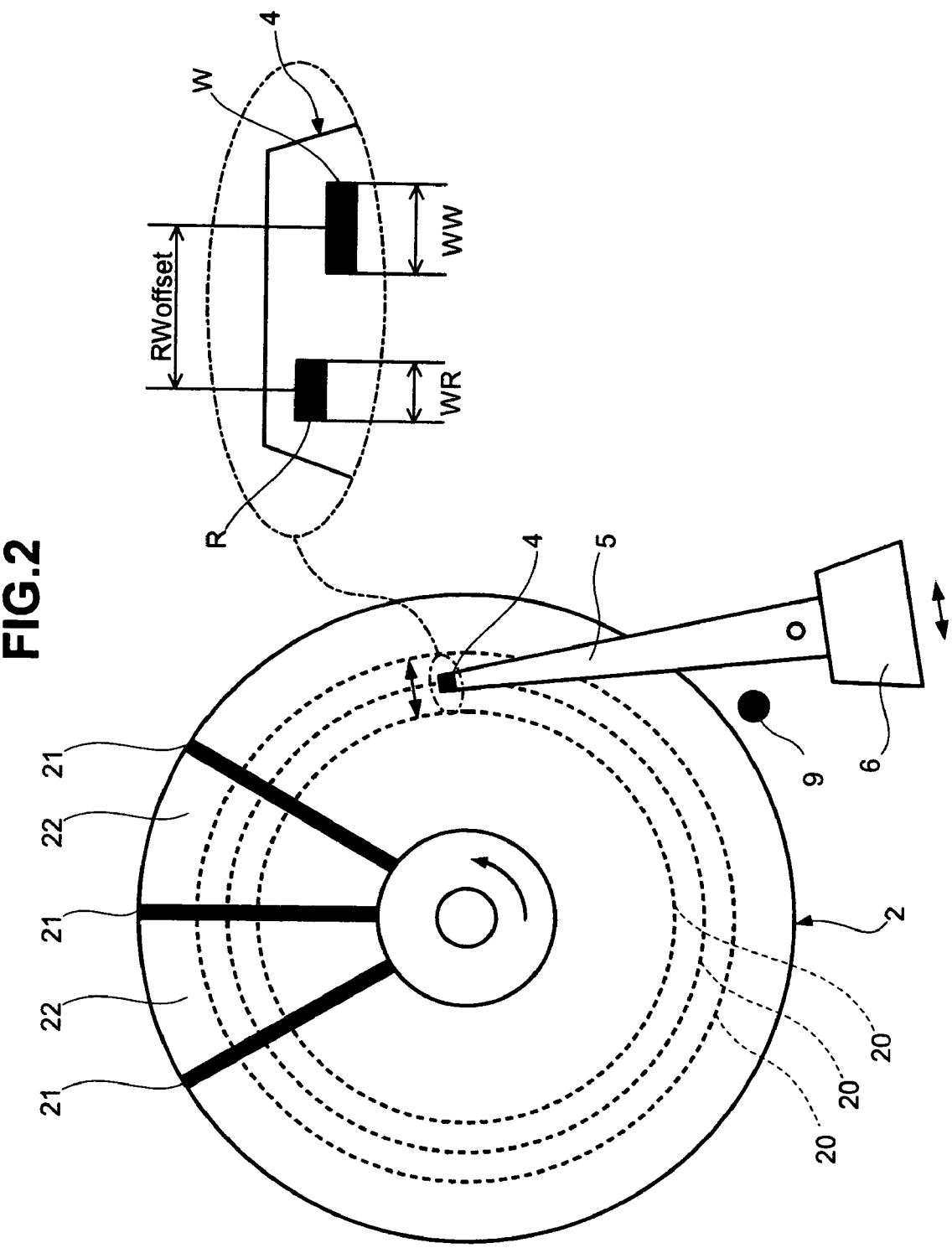
FIG. 2 is a top view that illustrates the major components of the hard disk drive.

FIG. 1 is a block diagram that illustrates major components of a hard disk drive 1. FIG. 2 is a top view that illustrates the major components of the hard disk drive 1. The hard disk drive 1 includes a magnetic disk 2, a spindle motor 3, a magnetic head 4, an actuator 5, a VCM (voice coil motor) 6, a VCM driver 7, a DAC (digital/analog converter) 8, a crash stop 9, a preamplifier 10, a read/write channel 11, an MPU (microprocessing unit) 12, an HDC (hard disk controller) 13, a ROM (read-only memory) 14, and a RAM (random access memory) 15, and is connected via the HDC 13 to a computer or like device, which is not shown. Although one or more units of the magnetic disk 2 are installed as needed, FIG. 1 shows an example in which only one unit of the magnetic disk 2 is installed.

While the hard disk drive 1 is operating, the magnetic disk 2, which is used as a disk-type storage medium, is driven to rotate around a spindle axis of the spindle motor 3. When the hard disk drive 1 is not operating, the magnetic disk 2 stops rotating (comes to a standstill). A plurality of tracks 20 are concentrically formed on a surface of the magnetic disk 2. Further, a plurality of position information storage areas 21 are radially formed in the radial direction of the magnetic disk 2. Data storage areas 22 are formed in the remaining regions. The position information storage areas 21 store servo information and other items of information. Only three tracks 20 are shown in FIG. 2. In reality, however, many tracks 20 are formed in the radial direction of the magnetic disk 2. Further, FIG. 2 shows three position information storage areas 21 and the data storage areas 22, which are positioned between the position information storage areas. In reality, however, many position information storage areas 21 and data storage areas 22 are formed in the radial direction of the magnetic disk 2. The position information storage areas 21 and data storage areas 22 will be described later in detail.

The magnetic head 4 is mounted at the end of the actuator 5 in such a manner that it is properly positioned relative to the front and back surfaces of the magnetic disk 2. In the present embodiment, the front and back surfaces of the magnetic disk 2 serve as the storage surfaces. The magnetic head 4 is a composite head, which contains a write head W for writing data onto the magnetic disk 2 and a read head R for reading data from the magnetic disk 2. The read head R also reads the servo information stored on the magnetic disk 2. The write head W also writes the servo information onto the magnetic disk 2 as described later. The write head W has a write head width WW. The read head R is positioned closer to the center of the magnetic disk 2 than the write head W. The read head width WR of the read head R is narrower than the write head width WW. More specifically, the read head R and the write head W are positioned at a predetermined distance from each other. The distance between the widthwise center of the read head R and the widthwise center of the write head W is referred to as the read/write offset (RWoffset). In the present embodiment, a transducer induction type head is used as the write head W and a GMR (giant magnetoresistive) head is used as the read head R. As the read head R, an MR (magnetoresistive) head, a TMR (tunneling magnetoresistive) head, or other magnetoresistive device may be used instead of a GMR head. In the hard disk drive 1, the position of the read head R or the write head W can be determined when the read head R of the magnetic head 4 reads the servo information stored in the position information storage areas 21 of the magnetic disk 2.

The magnetic head 4 and the actuator 5 move, as an assembly, in the radial direction of the magnetic disk 2. The crash stop 9, which is mounted on a lateral surface of the actuator 5, limits the movement of the actuator 5 toward the center of the magnetic disk 2, thereby preventing the magnetic head 4 from colliding with a spindle or other component. The crash stop 9 consists, for instance, of a metal bar to which an elastic rubber coat is applied. Further, a ramp (not shown) is positioned outside the magnetic disk 2. While the magnetic head 4 is not driven, this ramp is used to position the actuator 5 away from the magnetic disk 2.

The actuator 5 is driven by the VCM 6. It can therefore be said that the VCM 6 drives the magnetic head 4. The VCM 6 comprises a coil-based mover and a permanent-magnet-based stator. When the VCM driver 7 supplies a predetermined current to the coil (hereinafter referred to, if necessary, as the VCM current Ivcm), the mover is driven to move or stop the magnetic head 4, which is mounted on the actuator 5, over the magnetic disk 2.

The read/write channel 11 performs a data read/data write process. More specifically, the read/write channel 11 receives write data that is transferred from a computer (not shown) via the HDC 13, converts the received write data to a write signal (current), and supplies the write signal to the write head W of the magnetic head 4. In accordance with the write current, the write head W writes the data onto the magnetic disk 2. Meanwhile, the read signal read from the magnetic disk 2 by the read head R of the magnetic head 4 is amplified by the preamplifier 10, converted to digital data by the read/write channel 11, and output to the computer (not shown) via the HDC 13. The digital data contains the servo information. The read/write channel 11 incorporates a high-precision clock 11a, which can be used as a timer.

The HDC 13 is capable of interfacing with the hard disk drive 1. Thanks to its interfacing function, the HDC 13 receives write data, which is transferred from the computer (not shown), and transfers the received write data to the read/write channel 11. The HDC 13 also receives read data (user data information), which is transferred from the read/write channel 11, and transfers the received read data to the computer (not shown). Further, upon receipt of a directive command or other instruction from the computer (not shown), the HDC 13 transfers read data (servo information) to the MPU 12.

The MPU 12 provides control over the hard disk drive 1. Being capable of functioning as a servo controller, the MPU 12 exercises motion control over the magnetic head 4. The MPU 12 interprets and executes a program stored in the ROM 14. The MPU 12 determines the position of the magnetic head 4 in accordance with the servo information transferred from the read/write channel 11, and outputs a speed control value for the magnetic head 4 to the DAC 8 in accordance with the deviation of the determined position of the magnetic head 4 from the target position. The speed control value, which is handled as a motion instruction for the magnetic head 4, is output each time the servo information is read by the read head R of the magnetic head 4.

The DAC 8 receives the speed control value, which is output from the read head R of the magnetic head 4, converts the speed control value to an analog signal (voltage signal), and outputs the analog signal to the VCM driver 7. The VCM driver 7 receives the voltage signal from the DAC 8, converts the voltage signal to a drive current, and supplies the drive current to the VCM 6.

Figure 3:
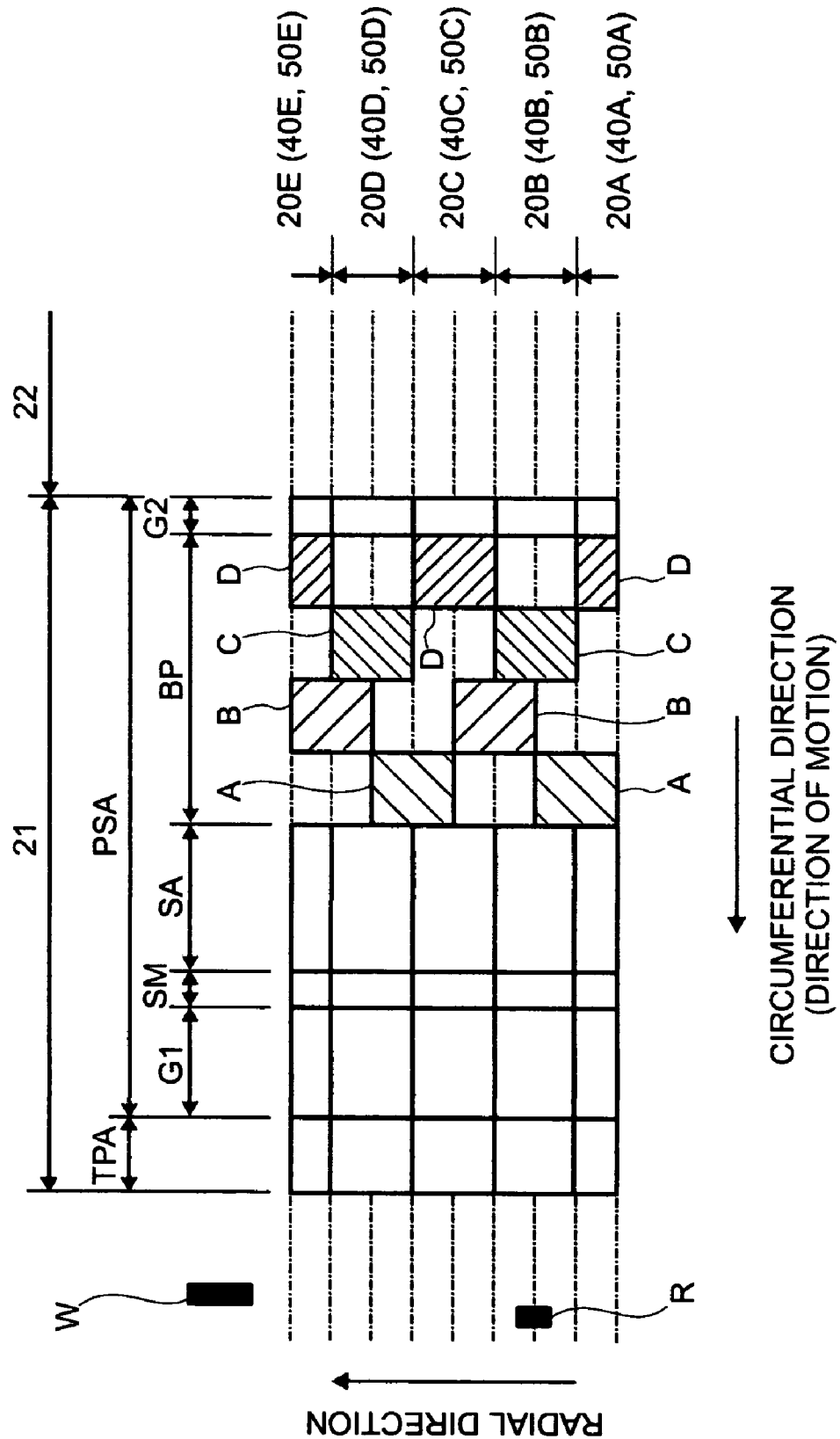
FIG. 3 is an enlarged view of a position information storage area and a data storage area, which are formed on a surface of a magnetic disk.

FIG. 3 is an enlarged view of a position information storage area 21 and a data storage area 22, which are formed on a surface of the magnetic disk 2. The aforementioned tracks 20 are formed concentrically formed in the radial direction of the magnetic disk 2. These tracks run through the position information storage areas 21 and the data storage areas 22. FIG. 3 merely shows certain tracks 20A–20E instead of all the tracks 20. As regards tracks 20A and 20E, however, only their halves are shown.

Within a position information storage area 21, a trigger pattern storage area TPA and a product servo storage area PSA are formed in the circumferential direction of the magnetic disk 2.

The trigger pattern storage area TPA stores a trigger pattern, which is used to create an accurate time signal for adjusting the signal phases of tracks during a self servo write described later. This area stores a cycle pattern called a "sync" pattern and a fixed sync mark, which is not a periodic signal. The sync mark is capable of deciding the timing within the trigger pattern. From upstream to downstream in the circumferential direction of the magnetic disk 2, the areas formed within the product servo storage area PSA are a first unoccupied area G1, a servo mark storage area SM, a track identification information (servo address) storage area SA, a burst pattern storage area BP, and a second unoccupied area G2.

The servo mark storage area SM, which is within the product servo storage area PSA, stores a servo mark that indicates the beginning of a servo signal write area. The identification information storage area SA stores identification information that uses a gray code (cyclic binary code) to indicate the address of a track and sector. The burst pattern storage area BP stores a burst pattern, which is used for position control of the magnetic head 4. As shown in FIG. 3, the burst pattern consists of four burst pattern rows A–D, which contain signal storage areas (shaded areas) arranged at fixed spacing intervals in the radial direction of tracks, and differ in signal storage area phase. Burst pattern rows A and B are 180 degrees out of phase with each other. Burst pattern rows C and D too are 180 degrees out of phase with each other. Burst pattern rows B and C are 90 degrees out of phase with each other. The first unoccupied area G1 and the second unoccupied area G2 are furnished as extra areas to provide a margin for a trigger pattern/burst pattern write.

For the hard disk drive 1 according to the present embodiment, servo information is written onto the magnetic disk 2 by a self servo write method when all components are completely assembled into the hard disk drive 1 during its manufacturing process. The program for such a self servo write is recorded beforehand in the ROM 14 or transferred from an external device (not shown) and stored in the RAM 15.

Figure 4:
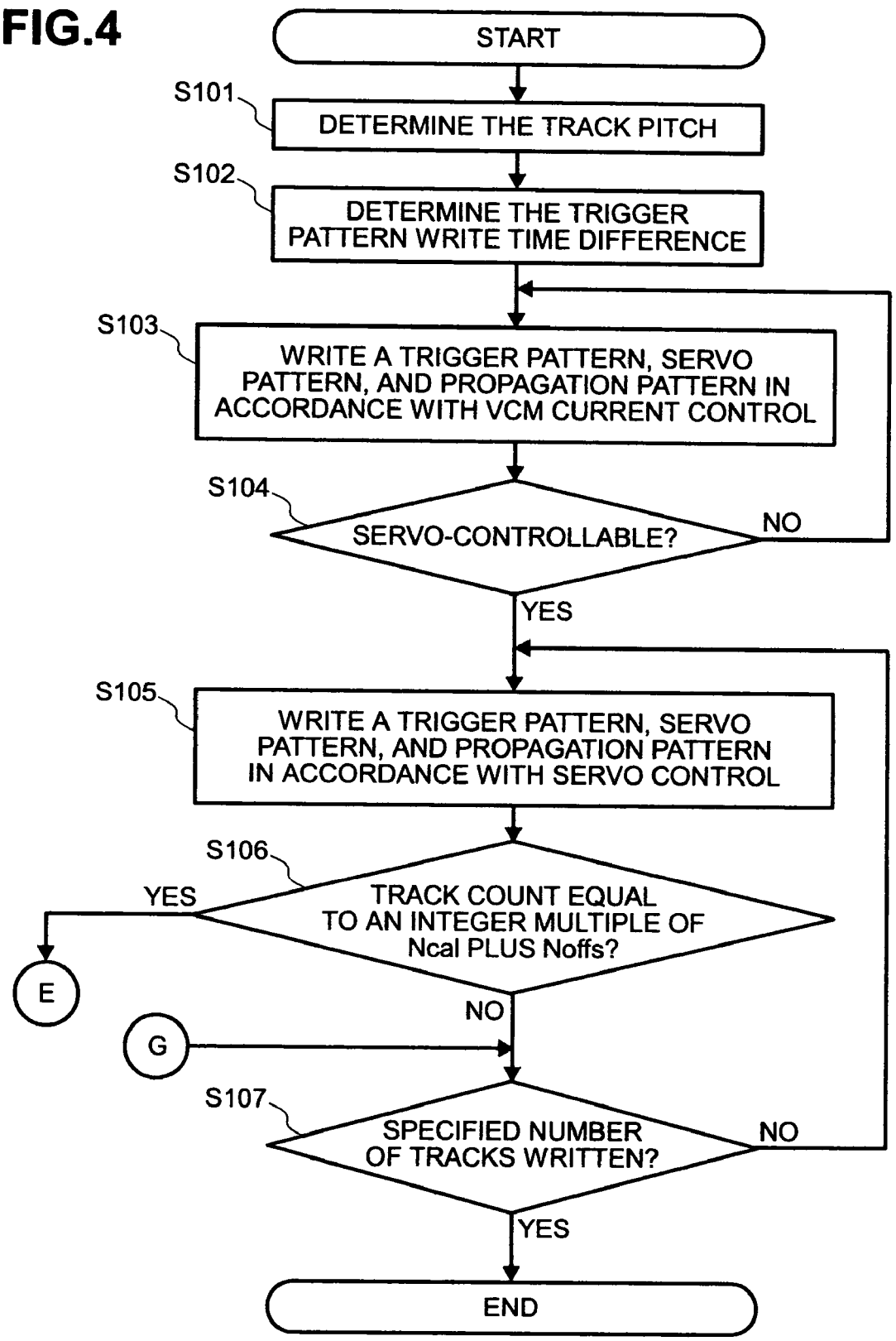
FIG. 4 is a flowchart illustrating a self servo write process.

FIG. 4 is a flowchart illustrating a self servo write process that is performed by the hard disk drive 1 according to the present embodiment. In the hard disk drive 1 of the present embodiment, the read/write offset RWoffset (see FIG. 2) exists between the read head R and the write head W. Therefore, there is an area in which the read head R cannot read the servo information that is written by the write head W at an initial stage of a self servo write. As such being the case, the method for writing new servo information without reading the servo information written on the magnetic disk 2 is coordinated with the method for writing new servo information while reading the servo information written on the magnetic disk 2 for the purpose of performing a self servo write.

First, the track pitch for the servo information to be written into a position information stage area 21 of the magnetic disk 2 is determined (step S101). Next, the write time difference between trigger patterns to be written into a trigger pattern storage area TPA within the position information storage area 21 of the magnetic disk 2 is determined (step S102). Subsequently, a trigger pattern, a servo pattern, and a propagation pattern are written into a track of the magnetic disk 2 in accordance with the control of the VCM current flow the VCM 6 (step S103). The servo pattern and propagation pattern will be described later in detail.

Step S104 is performed to check whether servo control can be exercised using the written servo pattern. If servo control cannot be exercised, the control flow returns to step S103, thereby continuing to write a trigger pattern, servo pattern, and propagation pattern.

If, on the other hand, servo control can be exercised, the VCM current Ivcm is controlled so that the servo pattern written on the magnetic disk 2 is read by the read head R in the aforementioned sequence. The trigger pattern, servo pattern, and propagation pattern are then written onto the magnetic disk 2 in accordance with the servo control operation that is performed to position the magnetic head (write head W) in accordance with the read servo pattern (step S105). In such an instance, the read head R reads the propagation pattern written on the magnetic disk 2 to correct the position of the magnetic head 4 (write head W). Next, step S106 is performed to check whether the number of tracks for which a write is completed is equal to an integer multiple of a predetermined integer Ncal plus Noffs.

If the above number of tracks is not equal to an integer multiple of the predetermined integer Ncal plus Noffs, step S107 is performed to check whether a trigger pattern/servo pattern/propagation pattern write is completed for a predetermined number of tracks. If such a write is not completed, the control flow returns to step S105, thereby continuing to perform a trigger pattern/servo pattern/propagation pattern write. If, on the other hand, the above write is completed, a series of processing steps comes to an end. If, the number of tracks for which a write is completed is equal to an integer multiple of a predetermined integer Ncal plus Noffs, PES linearity calibration is effected with a measurement pattern (see FIG. 15), and the control flow returns to step S107 upon completion of the calibration. The value Noffs represents the number of tracks that corresponds to the read/write offset RWoffset. The calibration will be described later in detail.

The trigger pattern/servo pattern/propagation pattern write will now be described with reference to FIG. 5.

Figure 5:
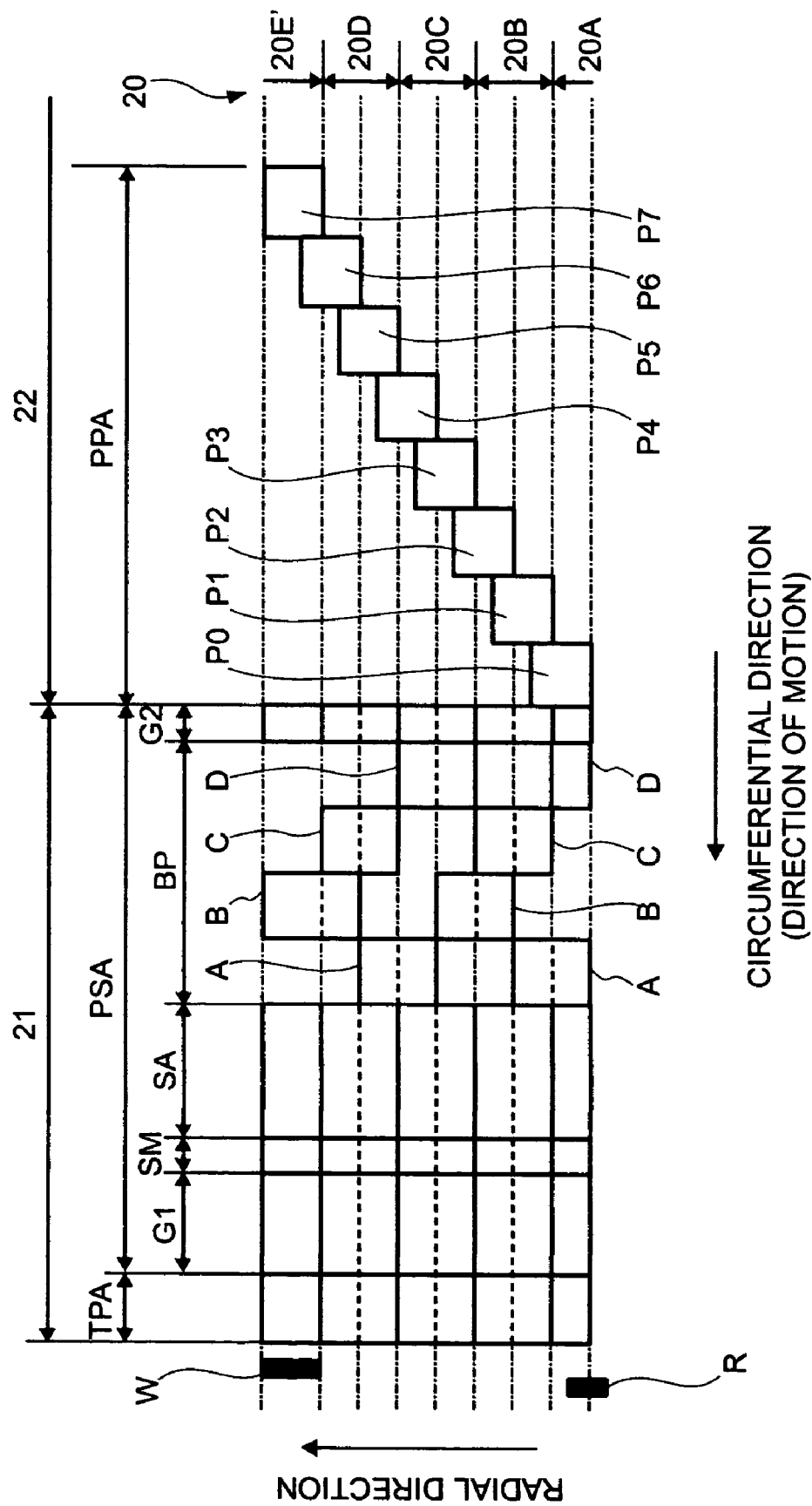
FIG. 5 illustrates trigger patterns, servo patterns, and propagation patterns that are to be written on a surface of the magnetic disk.

FIG. 5 shows a situation where trigger patterns, servo patterns, and propagation patterns are already written in tracks 20A to 20D, and then the write head W writes a trigger pattern, servo pattern, and propagation pattern in the next track 20E while the read head R reads the servo patterns written in tracks 20 (this sequence corresponds to step S105). As is obvious from the figure, the propagation patterns P0–P7 are written in a data storage area 22 and not in a position information storage area 21. Therefore, the propagation patterns P0–P7 are overwritten by subsequently written data. It means that they are erased before actual use. In the present embodiment, the read head R reads burst pattern rows A to D, which are written in a burst pattern storage area BP, and the position of the write head W is controlled at the time of a self servo write in accordance with the signal (PES: position error signal) that the read head R outputs in accordance with a pattern.

In a self servo write according to the present embodiment, a servo information write is performed in such a manner as to overwrite a part of a previously written track as shown in FIG. 5. Burst pattern rows A to D are written twice in halves so that the resulting pattern phase disagreement may cause an amplitude error. The position signals normally used for servo are (A−B)/(A+B) and (C−D)/(C+D). The signal width is prescribed by the width of the write head W and narrower than the track pitch. A position signal (auxiliary position signal) based on a different calculation method such as for amplitude weighted averaging can be formed from three (or more) propagation bursts having a read amplitude. This process enhances the head positioning accuracy because the auxiliary position signal is used to properly correct the position signal derived from a servo pattern.

In the hard disk drive 1 according to the present embodiment, a self servo write is performed while servo control is exercised making use of a burst pattern that is used for servo control before use. Therefore, increased ease of control is provided when compared to a conventional method, that is, a situation where a self servo write is performed while servo control is exercised making use of a propagation pattern. In other words, the control system initially possessed by the hard disk drive 1 can be used to perform a self servo write. Therefore, the processing capacity requirements for a self servo write can be satisfied by the hard disk drive 1's built-in HDC 13 and MPU 12 alone. Thus, increased ease of self servo write is provided. Further, the inconsistency of a low-reliability burst pattern can be compensated for by using a propagation pattern for the purpose of enhancing the self servo write accuracy.

Figure 6:
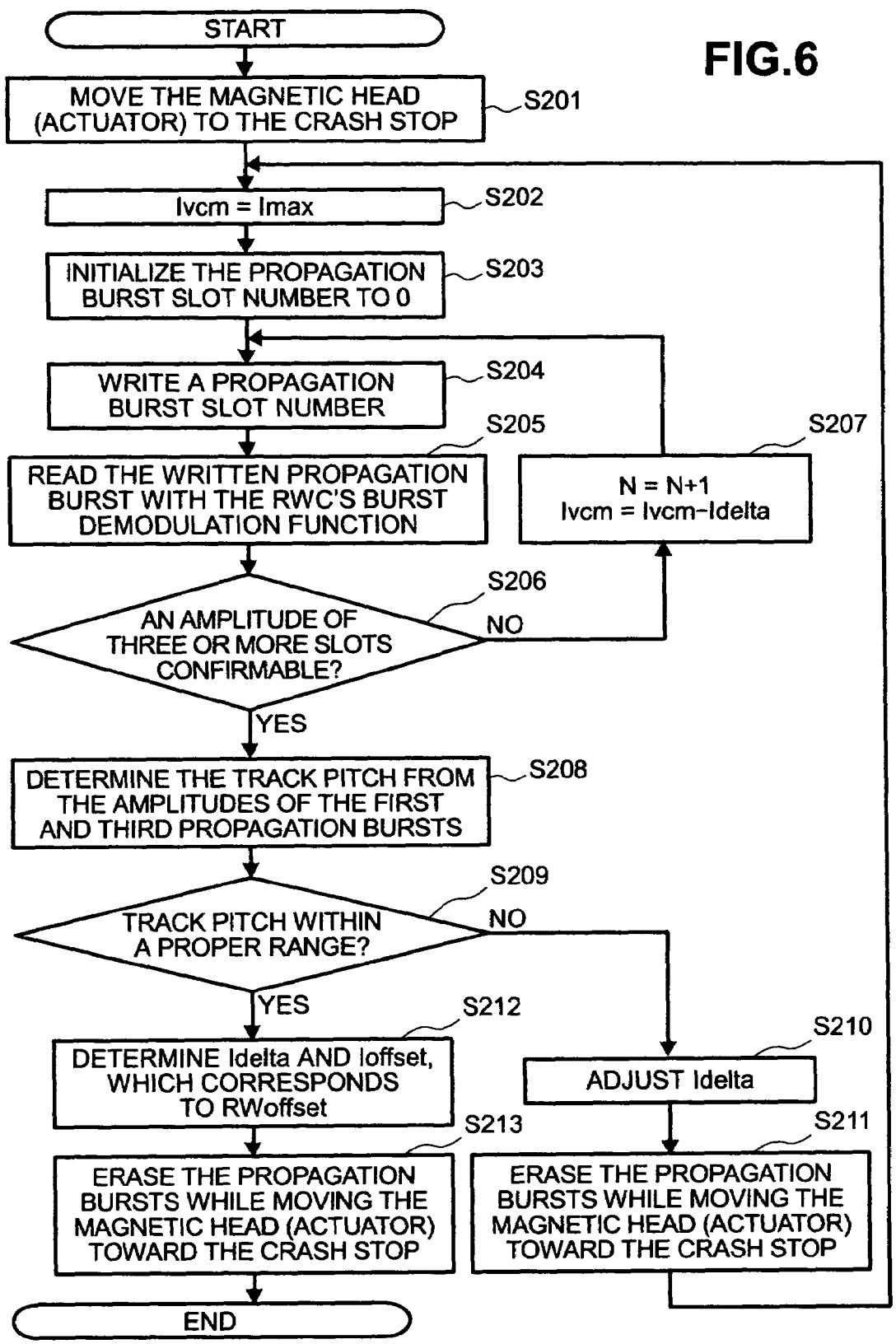
FIG. 6 is a flowchart illustrating the process that is performed to determine the track pitch.

The individual steps of the above process will now be described in detail. First of all, step S101, that is, the process for determining the track pitch (feed pitch) for the servo information (including a trigger pattern) to be written into a position information storage area 21 of the magnetic disk 2 will be described in detail. FIG. 6 is a flowchart illustrating the process that is performed to determine the track pitch.

First, the VCM current Ivcm flows to the VCM 6 so as to provide a constant actuator speed, and then the magnetic head 4 (actuator 5) is loaded from the ramp (not shown) to the magnetic disk 2 and, at the same time, moved toward the crash stop 9 (step S201). Then, the VCM current Ivcm is set to a considerably large current value Imax (step S202) to strong press the actuator 5 against the crash stop 9, thereby positioning the magnetic head 4 (write head W), which is mounted on the end of the actuator 5, in a specified position within an inner area of the magnetic disk 2. At the same time, the slot number N for a propagation burst is initialized to zero (0) (step S203). The propagation burst is a special burst pattern for use in track pitch determination.

Next, the write head W is used to write the propagation burst slot number N onto the magnetic disk 2 (step S204). The read/write channel 11 then exercises its burst demodulation function (the function of the read/write channel 11 for measuring the burst amplitude) to read the amplitude of the written propagation burst (step S205). Then, step S206 is performed to check whether the read head R can confirm that the amplitude of the written propagation burst is three or more slots.

Figure 7A:
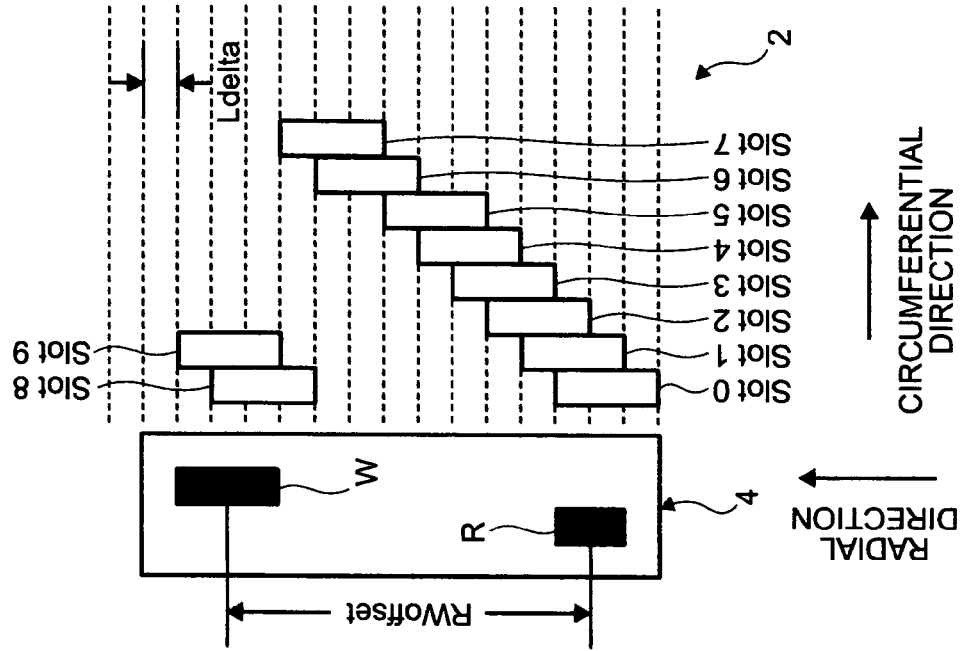
FIGS. 7(a) and 7(b) illustrate a state where propagation bursts are written on the magnetic disk.
Figure 7B:
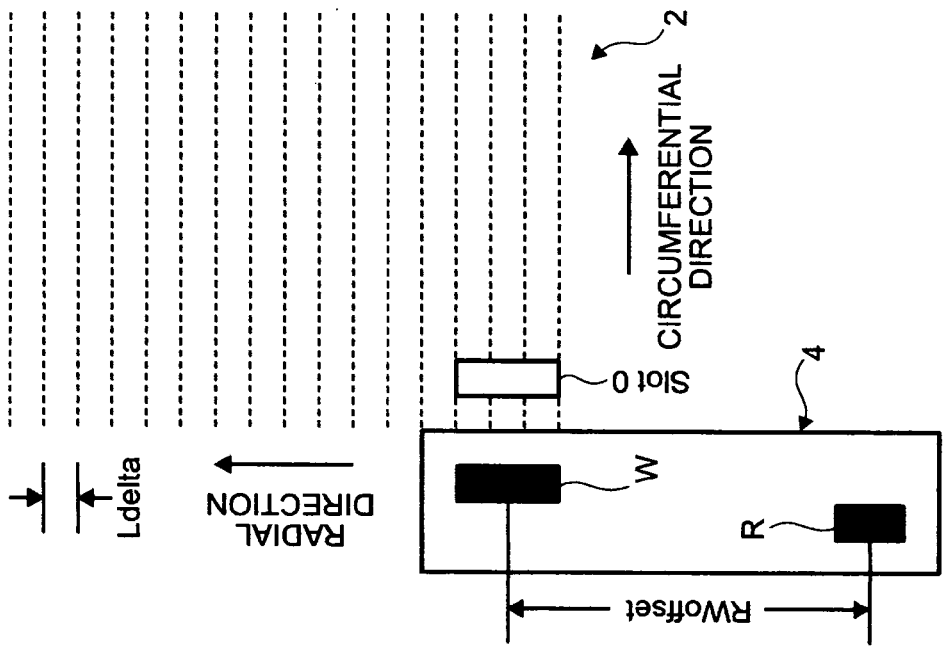

If the read head R cannot read three or more slots of propagation bursts, step S207 is performed to set the slot number N to N+1 and the VCM current Ivcm to Ivcm−Idelta. The current flow to the VCM 6 is slightly reduced in this manner to slight move the write head W outward, and then the control flow returns to step S204. The initial Idelta value is determined according to prior experiments. However, the Idelta value is to be appropriately corrected in accordance with the results obtained later. FIG. 7(a) shows a state where propagation burst slot 0 is written on the magnetic disk 2. In this state, it is understandable that the read head R can read no slot of propagation burst due to the existence of the read/write offset RWoffset. FIG. 7(b) shows a state where propagation burst slots 0 to 9 are written on the magnetic disk 2. The example shown in this figure indicates that the read head R can read three slots (slots 0 to 2) of propagation bursts. In FIGS. 7(a) and 7(b), the distance Ldelta represents the distance over which the magnetic head 4 (write head W/read head R) moves when the VCM current Ivcm is decreased by Idelta. If, on the other hand, the read head R can read three or more slots of propagation bursts, step S208 is performed to determine the track pitch in accordance with the relationship between the amplitude of the first read propagation burst (slot 0 in the example shown in FIG. 7(*b*)) and the amplitude of the third read propagation burst (slot 2 in the example shown in FIG. 7(*b*)).

Next, step S209 is performed to check whether the determined track pitch is within a proper range. If the track pitch is outside the proper range, step S210 is performed to adjust the Idelta value. If, for instance, the track pitch is greater than the upper limit, the Idelta setting is decreased. If the track pitch is smaller than the lower limit, the Idelta setting is increased. After Idelta value adjustment, the write head W erases the written propagation bursts while the actuator 5 moves toward the crash stop 9 (step S211). The control flow then returns to step S202 and determines the track pitch by performing the above procedure again.

If the track pitch is within the proper range, step S212 is performed to determine the Idelta value as well as the current value Ioffset, which is necessary for moving the actuator 5 by a distance equivalent to the read/write offset RWoffset over the magnetic disk 2. The write head W then erases the written propagation bursts while the actuator 5 moves toward the crash stop 9 (step S213). A series of processing steps is now completed. The above Idelta value and Ioffset value are stored in the RAM 15.

Figure 8:
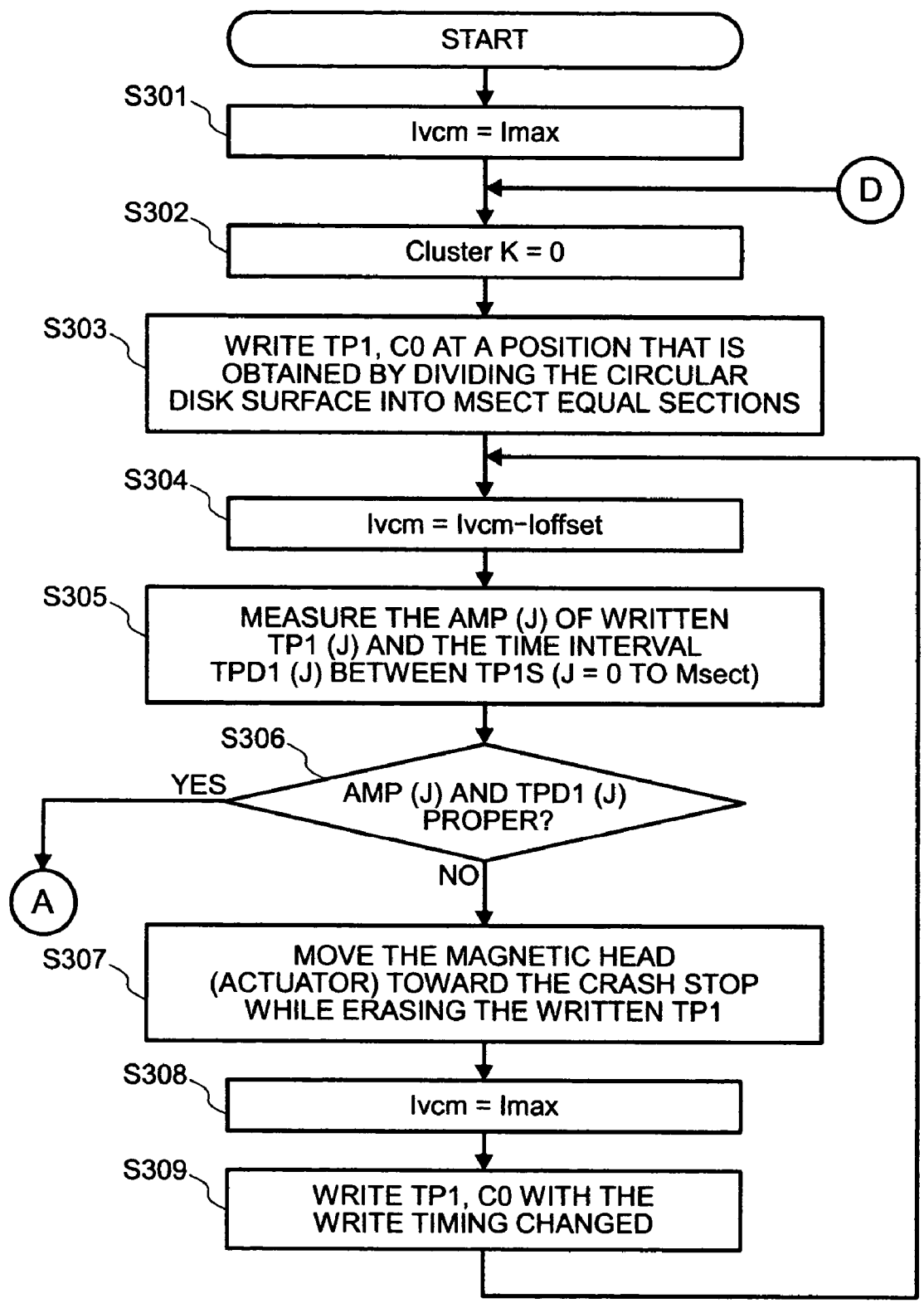
FIG. 8 is a flowchart illustrating the process for determining the trigger pattern write time difference.
Figure 9:
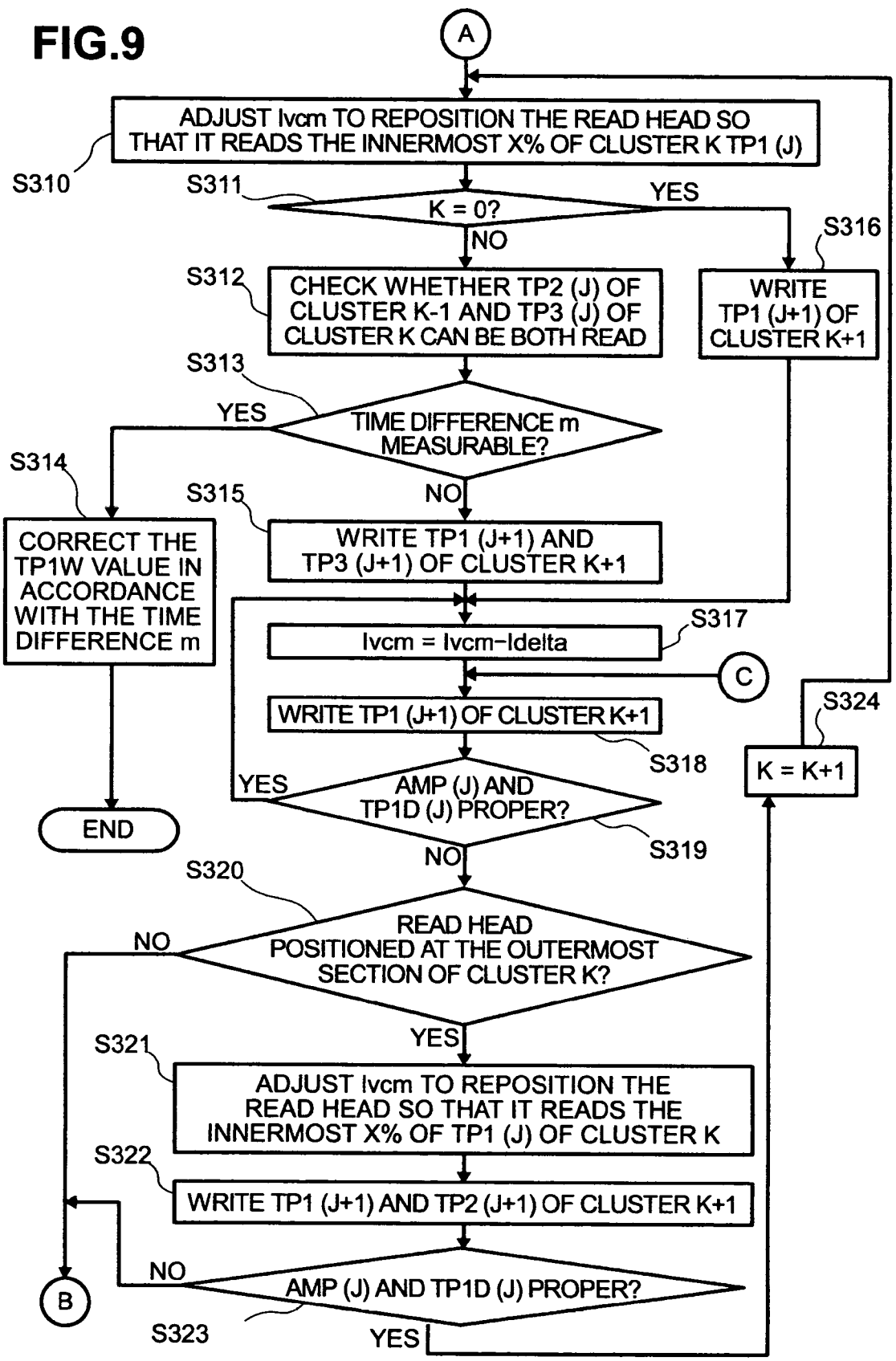
FIG. 9 is a flowchart (continued) illustrating the process for determining the trigger pattern write time difference.
Figure 10:
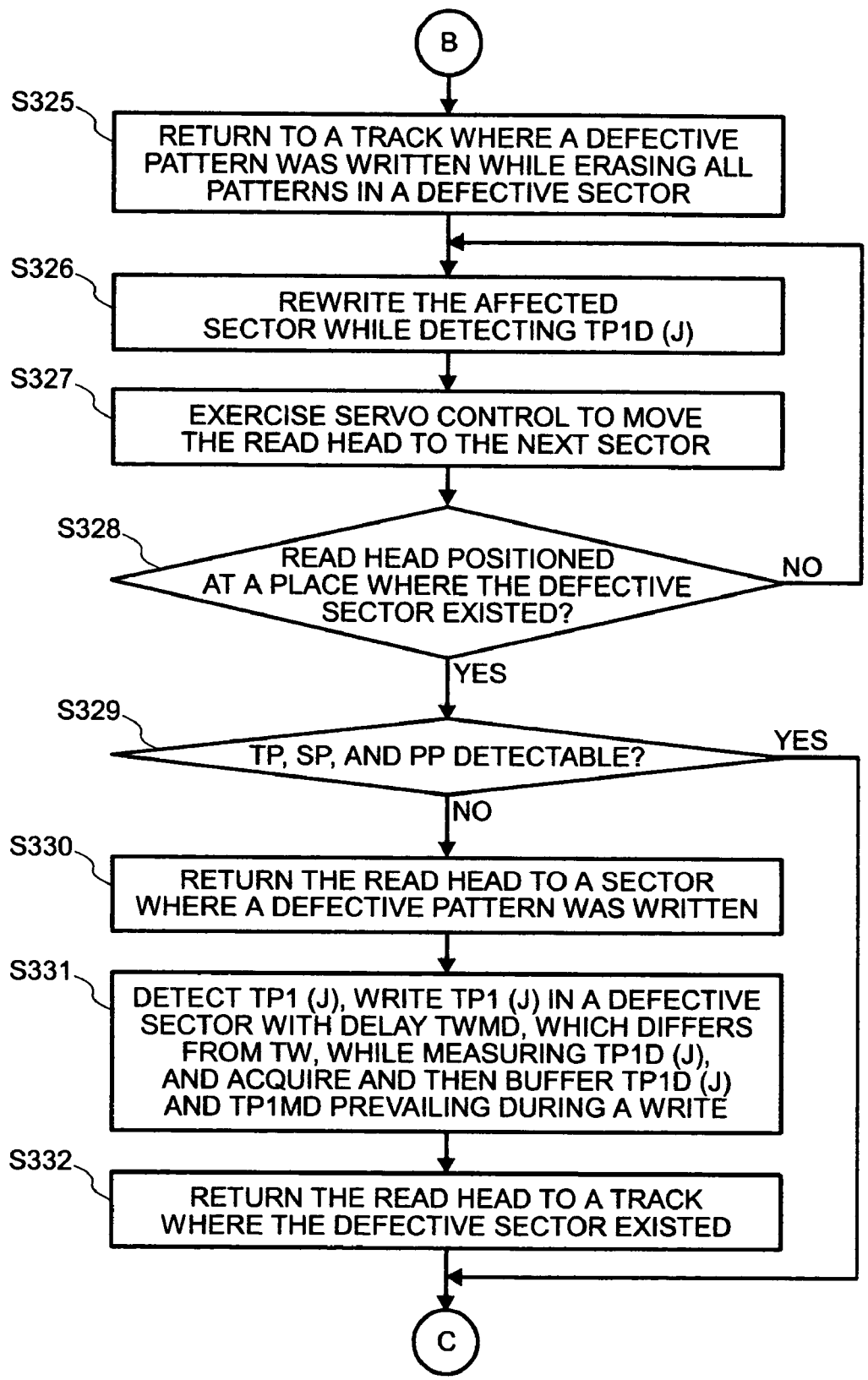
FIG. 10 is a flowchart (continued) illustrating the process for determining the trigger pattern write time difference.

Step S102, that is, the process for determining a trigger pattern write time difference will now be described in detail. FIGS. 8 to 10 are flowcharts illustrating the process for determining the trigger pattern write time difference.

First, the VCM current Ivcm, which is set to Imax, flows to the VCM 6 (step S301), and the actuator 5 is strongly pressed against the crash stop 9 so as to position the magnetic head 4 (write head W), which is mounted on the end of the actuator 5, at a specified inner position on the magnetic disk 2. Then, a cluster K setting of 0 is selected (step S302), and the write head W writes trigger pattern TP1 onto cylinder C0 whose cluster is 0 and at a position that is obtained by dividing the circular surface of the magnetic disk 2 into Msect equal sections (step S303). Trigger pattern TP1 is written onto the magnetic disk 2 in accordance with an index signal that is generated upon each revolution of the magnetic disk 2. More specifically, the write of trigger pattern TP1 is started with a specified delay from index signal detection and repeated at specified time intervals until disk recording is completed. The number of equal sections into which the circular surface of the magnetic disk 2 is divided varies with the target hard disk drive 1. The term "cluster" represents a group of contiguous tracks having the same track pitch.

Next, the VCM current flow (Ivcm) to the VCM 6 is set to Ivcm−Ioffset (step S304), and the read head R moves to a position at which trigger pattern TP1 is written. The read head R then reads the written trigger pattern TP1 and sends the read trigger pattern signal to the read/write channel 11. The read/write channel 11 measures the output AMP (J) of trigger pattern TP1 (J) (J=0 to Msect−1) and the time interval TPD1 (J) between adjacent trigger patterns TP1 (step S305), to check whether the output AMP (J) and time interval TPD1 (J) obtained by the MPU 12 are proper (step S306).

If the obtained output AMP (J) or time interval TPD1 (J) is improper, the magnetic head 4 (actuator 5) moves toward the crash stop 9 while erasing the trigger pattern TP1 written on the magnetic disk (step S307). The VCM current Ivcm, which is set to Imax, flows to the VCM 6 (step S308), and the actuator 5 is strongly pressed against the crash stop 9 so as to position the magnetic head 4 (write head W), which is mounted on the end of the actuator 5, at a specified position.

The write timing for trigger pattern TP1 (J), that is, the delay between the instant at which the index signal is detected and the instant at which the write of trigger pattern TP1 (J) starts is then changed, and the write head W writes again trigger pattern TP1 (trigger pattern 1) onto cylinder C0 whose cluster is 0 and at a position that is obtained by dividing the circular surface of the magnetic disk 2 into Msect equal sections (step S309). Then, the control flow returns to step S304 and continues with the process. If, on the other hand, the obtained output AMP (J) and time interval TPD1 (J) are proper, the VCM current Ivcm is adjusted, and the actuator 5 moves so that the read head R reads the innermost X % of TP1 (J) of cluster K (step S310). The value X is set as appropriate.

Next, step S311 is performed to check whether the value K of cluster K is 0. If the value K is not 0, step S312 is performed with the magnetic head 4 maintained in the same position to check whether the read head R can read both TP2 (J) of cluster K−1 and TP3 (J) of cluster K. If the read head R can read both TP2 (J) of cluster K−1 and TP3 (J) of cluster K, the time difference m between TP2 (J) of cluster K−1 and TP3 (J) of cluster K can be measured (step S313). The write time interval value TP1W is then corrected in accordance with the measured time difference m (step S314). The process is now completed. The write time interval TP1W is the time interval between the instant at which the read head R reads a written trigger pattern and the instant at which the write head W starts writing the next trigger pattern.

If, on the other hand, the read head R cannot read both TP2 (J) of cluster K−1 and TP3 (J) of cluster K, the read/write channel 11 detects the sync mark of each trigger pattern TP1, the write time interval TP1W (J+1) for the next sector is determined from the obtained time interval TP1D (J) between trigger patterns TP1 (J), and the write head W writes TP1 (J+1) and TP3 (J+1) into cluster K+1 (step S315).

If the value K of cluster K is 0 in step S311, step S316 is performed to write TP1 (J+1) of cluster K+1.

Next, the VCM current Ivcm is set to Ivcm−Idelta (step S317) for the purpose of slightly decreasing the current flow to the VCM 6. This moves the actuator 5, that is, the magnetic head 4 (write head W) to the next write position. The read/write channel 11 then detects the sync mark of each trigger pattern TP1, the write time interval TP1W (J+1) for the next sector is determined from the obtained time interval TP1D (J) between trigger patterns, and the trigger pattern TP1 (J+1) for cluster K+1 is then written (step S318).

Next, step S319 is performed to check whether the output AMP (J) of trigger pattern TP1 (J) and the time interval TP1D (J) between adjacent trigger patterns TP1 are proper. If the output AMP (J) of trigger pattern TP1 (J) and the time interval TP1D (J) between adjacent trigger patterns TP1 are proper, the control flow returns to step S317 and continues with the process. If, on the other hand, the output AMP (J) of trigger pattern TP1 (J) or the time interval TP1D (J) between adjacent trigger patterns TP1 is improper, step S320 is performed to check whether the read head R is positioned at the outermost section of cluster K. If the read head R is positioned at the outermost section of cluster K, the VCM current Ivcm is adjusted to move the actuator 5 so that the read head R is positioned to read the innermost X % of TP1 (J) of cluster K (step S321). Further, the read/write channel 11 detects the sync mark of each trigger pattern TP1, the write time interval TP1W (J+1) for the next sector is determined from the obtained time interval TP1D (J) between trigger patterns, and the write head W writes TP1 (J+1) and TP2 (J+1) into cluster K+1 (step S322). Next, step S323 is performed to check whether the output AMP (J) of trigger pattern TP1 (J) and the time interval TP1D (J) between adjacent trigger patterns TP1 are proper. If the output AMP (J) of TP1 (J) and the time interval TP1D (J) between adjacent trigger patterns TP1 are proper, step S324 is performed to select a K setting of K+1, and the control flow returns to step S310 and continues with the process.

If, on the other hand, the output AMP (J) of TP1 (J) or the time interval TP1D (J) between adjacent trigger patterns TP1 is improper and the read head R is not positioned at the outermost section of cluster K in step S320, it is concluded that the written data is defective. Step S325 is then performed to return to a track where a defective pattern was written while erasing all patterns in a defective sector. Next, step S326 is performed to rewrite the defective sector while detecting the time interval TP1D (J) between trigger patterns TP1. The hard disk drive 1 then exercises servo control to move the read head R to the next sector (step S327). Step S328 is performed to check whether the read head R is positioned at a place where the defective sector existed. If the read head R is not positioned at a place whether the defective sector existed, the control flow returns to step S326 and continues with the process.

If, on the other hand, the read head R is positioned at a place where the defective sector existed, step S329 is performed to check whether the read head R can detect a trigger pattern, servo pattern, and propagation pattern. In the drawings, a trigger pattern, servo pattern, and propagation pattern are abbreviated respectively to TP, SP, and PP. If the read head R cannot detect a trigger pattern, servo pattern, or propagation pattern, step S330 is performed to return the read head R to a sector where a defective pattern was written. TP1 (J) is detected and then written with a special delay TWMD, which differs from a normal delay TW, while measuring TP1D (J). TP1D (J) and TP1MD prevailing during a write are then acquired and buffered (step S331). Finally, the read head R is returned to a track where the defective sector existed (step S332), and the control flow returns to step S318.

Figure 11:
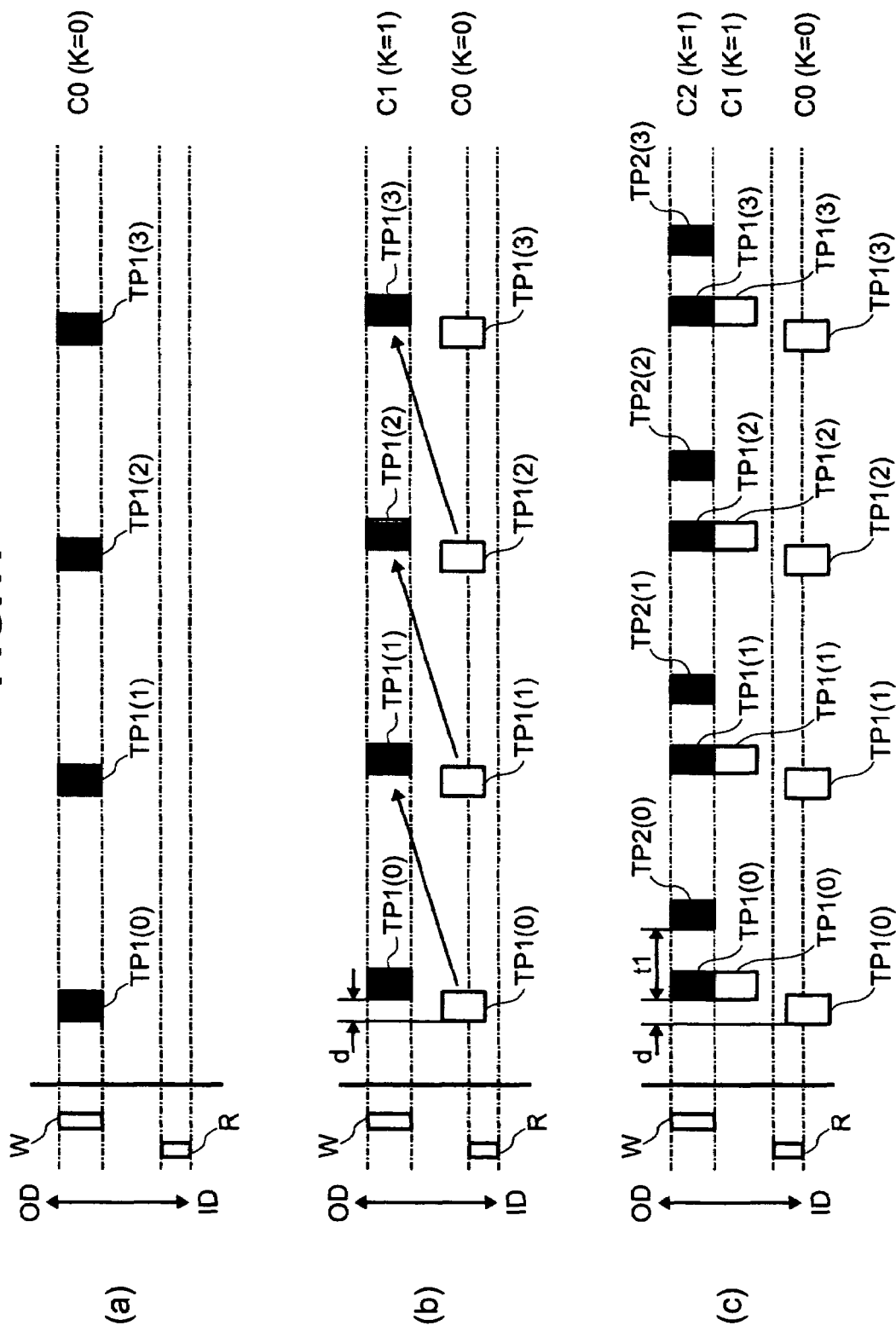
FIGS. 11(a), 11(b), and 11(c) are diagrams illustrating the trigger pattern write method that is employed during the process for determining the trigger pattern write time difference.
Figure 12:
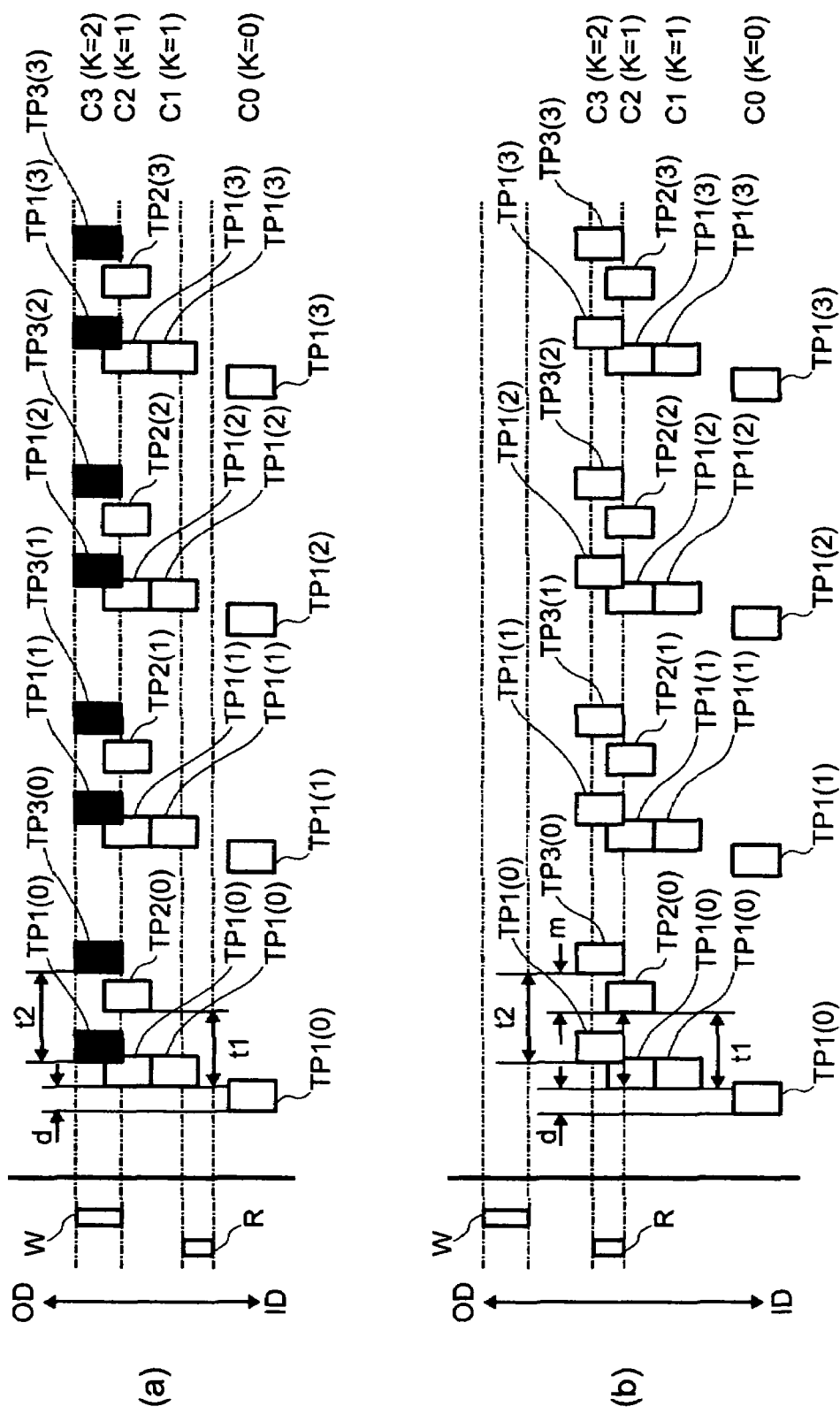
FIGS. 12(a) and 12(b) are diagrams (continued) illustrating the trigger pattern write method that is employed during the process for determining the trigger pattern write time difference.

The process for determining the write time difference between trigger patterns will now be described with reference to the examples shown in FIGS. 11 and 12. The trigger patterns in FIGS. 11 and 12 are represented by black or white rectangles. Black rectangles represent trigger patterns that are written in the current process, whereas white rectangles represent trigger patterns that were written in a previous process.

FIG. 11(a) shows a state where the VCM current Ivcm, which is set to Imax, flows to the VCM 6 so as to strongly press the actuator 5 against the crash stop 9, thereby positioning the magnetic head 4 (read head R/write head W), which is mounted on the end of the actuator 5, at a specified position. While this state is maintained, trigger patterns TP1 are sequentially written onto cylinder C0 having a cluster K value of 0.

FIG. 11(b) shows a state where the VCM current Ivcm is adjusted to position the actuator 5 so that the read head R reads the innermost X % (approximately 30% in the figure) of TP1 (J) having a cluster K value of 0. While this state is maintained, the read head R reads trigger pattern TP1 (J), which is written on cylinder C0 having a cluster K value of 0. In accordance with the detection timing of the read trigger pattern TP1 (J), trigger patterns TP1 (J+1) are sequentially written onto cylinder C1 having a cluster K value of 1. In this instance, there should be no time lag between the trigger pattern TP1 (J) written on cylinder C0 having a cluster K value of 0 and the trigger pattern TP1 (J) written on cylinder C1 having a cluster K value of 1. In reality, however, such a time lag d arises. The time lag d varies from one unit of the hard disk drive 1 to another due to individual differences (in terms of read/write offset RWoffset and circuit delay) among units of the hard disk drive 1.

FIG. 11(c) shows a state where the VCM current Ivcm is adjusted to position the actuator 5 so that the read head R reads the outermost X % (approximately 30% in the figure) of TP1 (J) having a cluster K value of 0. While this state is maintained, the read head R reads trigger pattern TP1 (J), which is written on cylinder C0 having a cluster K value of 0. In accordance with the detection timing of the read trigger pattern TP1 (J), trigger patterns TP1 (J+1) are sequentially written onto cylinder C2 having a cluster K value of 1. The time lag d is exactly the same as for writing trigger pattern TP1 (J+1) on cylinder C1 having a cluster K value of 1. Therefore, trigger pattern TP1 (J+1) is written onto cylinder C1 having a cluster K value of 1 with the same timing as for writing trigger pattern TP1 (J+1) onto cylinder C2 having a cluster K value of 1 (there is no time lag between these two write operations). Subsequently, the read head R reads the trigger pattern TP1 (J) written on cylinder C0 having a cluster K value of 0. Trigger patterns TP2 (J+1) are sequentially written onto cylinder C2 having a cluster K value of 1 with a predetermined delay from the detection of the read trigger pattern TP1 (J). The delay time applied in this instance is timer-controlled using the clock 11a within the read/write channel 11. Therefore, the time difference t1 between trigger pattern TP1 (J) and trigger pattern TP2 (J), which are written on cylinder C2 having a cluster K value of 1, is a known value. This value is stored in the RAM 15.

FIG. 12(a) shows a state where the VCM current Ivcm is adjusted to position the actuator 5 so that the read head R reads the innermost X % (approximately 30% in the figure) of TP1 (J) having a cluster K value of 1. While this state is maintained, the read head R reads trigger pattern TP1 (J), which is written on cylinder C1 having a cluster K value of 1. In accordance with the detection timing of the read trigger pattern TP1 (J), trigger patterns TP1 (J+1) are sequentially written onto cylinder C3 having a cluster K value of 2. In this case too, the trigger pattern TP1 (J) written on cylinder C3 having a cluster K value of 2 is delayed by d from the trigger pattern TP1 (J) written on cylinder C1 having a cluster K value of 1. Subsequently, the read head R reads the trigger pattern TP1 (J) written on cylinder C1 having a cluster K value of 1. Trigger patterns TP3 (J+1) are sequentially written onto cylinder C3 having a cluster K value of 2 with a predetermined delay from the detection of the read trigger pattern TP1 (J). The delay time applied in this instance is timer-controlled using the clock 11a within the read/write channel 11. Therefore, the time difference t2 between trigger patterns TP1 (J) and TP3 (J), which are written on cylinder C3 having a cluster K value of 2, is a known value. This value is stored in the RAM 15.

FIG. 12(b) shows a state where the VCM current Ivcm is adjusted to position the actuator 5 so that the read head R reads the innermost X % (approximately 30% in the figure) of TP1 (J) having a cluster K value of 2. While this state is maintained, the read head R is checked to determine whether it can read TP1 (J) and TP2 (J) written on cylinder C2 having a cluster K value of 1 in addition to TP1 (J) and TP3 (J) written on cylinder C3 having a cluster K value of 2. In the example shown in FIG. 11(b), the read head R can read the above trigger patterns.

In the state described above, the time difference m between the trigger pattern TP2 (J) written on cylinder C2 having a cluster K value of 1 and the trigger pattern TP3 (J)

written on cylinder C3 having a cluster K value of 2 is expressed as indicated below:

$$m=t2-t1+d$$

When the above expression is modified, the following is obtained:

$$d=m+t1-t2$$

The values t1 and t2 are known. In addition, the time difference m is measurable when it is read by the read head R. Therefore, it is possible to determine the time lag d between the trigger pattern TP1 (J) written on cylinder 0 having a cluster K value of 0 and the trigger pattern TP1 (J) written on cylinder C1 having a cluster K value of 1. The misalignment between circumferentially adjacent trigger patterns on the magnetic disk 2 can be corrected by correcting the above time lag d. If the read head R cannot read TP1 (J) and TP2 (J) written on cylinder C2 having a cluster K value of 1 in addition to TP1 (J) and TP3 (J) written on cylinder C3 having a cluster K value of 2, a trigger pattern write operation is continuously performed until the read head R can read such trigger patterns.

In the present embodiment, the read/write offset RWoffset existing between the read head R and the write head W is used to determine the trigger pattern write position and write timing (the write position in the circumferential direction and radial direction of the magnetic disk 2). Therefore, it is not necessary to write clock data in the outer area of the magnetic disk 2 by using a dedicated clock head. As a result, a self servo write can be performed by a simpler method. Further, the configuration will not be complicated because the clock 11a for use by a timing determination timer is incorporated in the read/write channel 11.

Figure 13:
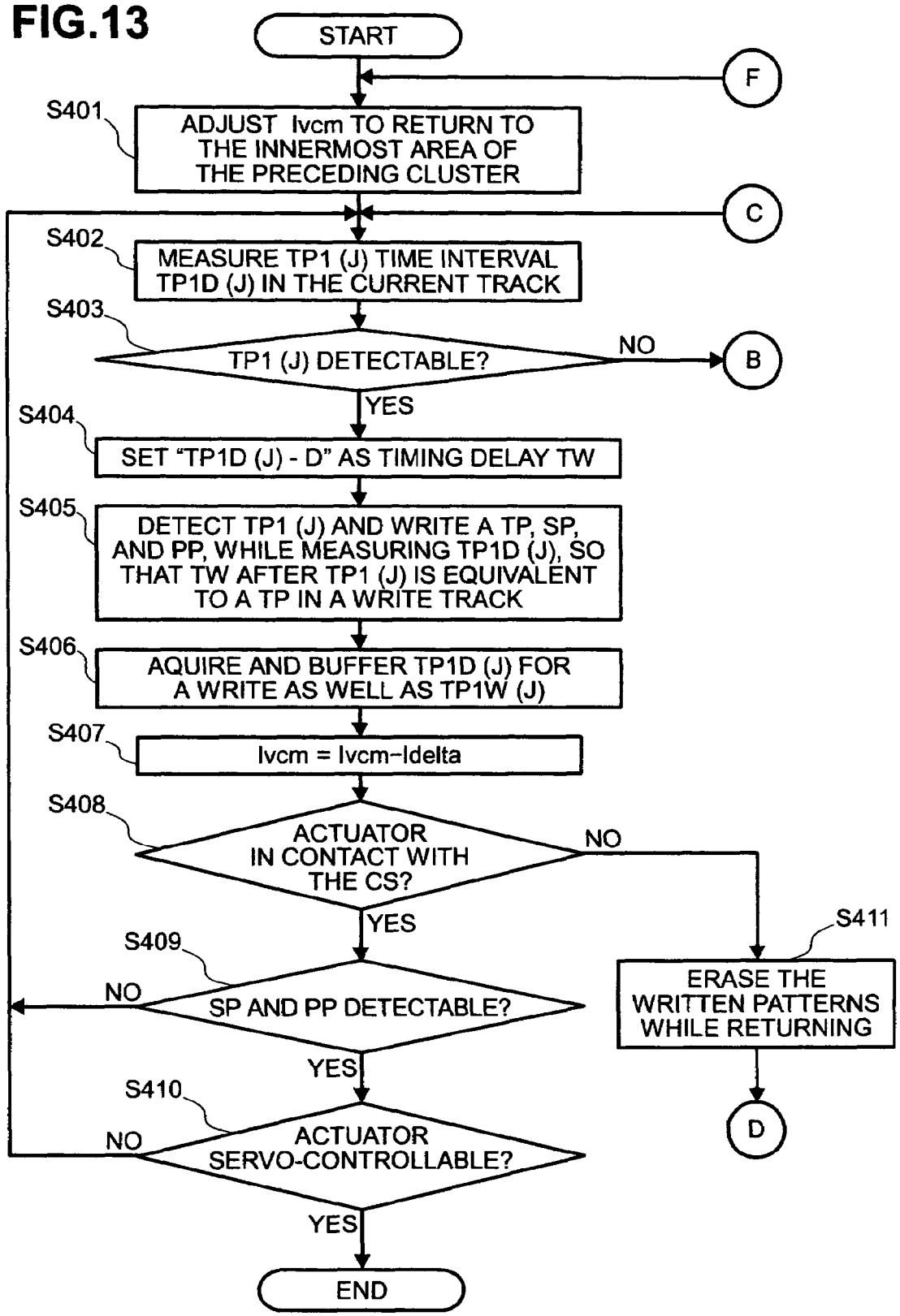
FIG. 13 is a flowchart illustrating a self servo write process that is performed in accordance with VCM current control.

Step S103, that is, the process for writing a trigger pattern, servo pattern, and propagation pattern onto the magnetic disk 2 in accordance with VCM current control will now be described in detail. FIG. 13 is a flowchart illustrating a self servo write process that is performed in accordance with VCM current control. For convenience of explanation, step S104 will also be described.

First, the VCM current Ivcm is adjusted so as to return the magnetic head 4 to the innermost area of the preceding cluster (cluster positioned immediately before the cluster in which TP2 and TP3 were both read) (step S401). Next, the time interval TP1D (J) between trigger patterns TP1 (J) is measured in the current track (step S402). Step S403 is then performed to check whether TP1 (J) can be detected. If TP (J) detection cannot be achieved, a defective sector is rewritten in the process shown in FIG. 9 and then the control flow returns to step S402. If TP (J) detection is achieved, on the other hand, the time difference TP1D (J)−d, which is the difference between the time interval TP1D (J) between the obtained trigger patterns TP1 (J) and the previously determined time difference d, is set as the timing delay TW (step S404).

Next, trigger patterns TP1 (J) are detected, and while the time interval TP1D (J) between the trigger patterns TP1 (J) is measured, a trigger pattern/servo pattern/propagation pattern write is performed in such a manner that the delay TW after the track pitch TP1 (J) is equivalent to a trigger pattern (TP) in a write track (step S405). The time interval TP1D (J) between trigger patterns TP1 (J) during the above write as well as the write time interval TP1W (J) for the next sector are acquired and then buffered (step S406).

Next, the VCM current is set to Ivcm−Idelta (step S407). While this state is maintained, step S408 is performed to check whether the actuator 5 is in contact with the crash stop 9. If the actuator 5 is in contact with the crash stop 9, step S409 is performed to check whether the read head R can detect a servo pattern and propagation pattern at the current position. If the read head R can detect a servo pattern and propagation pattern, step S410 is performed to check whether the actuator 5 can be servo-controlled using the servo pattern and propagation pattern. If such servo control can be exercised, the self servo write based on VCM current control terminates. If, on the other hand, the actuator 5 is not in contact with the crash stop 9 in step S408, the written patterns are erased while the actuator 5 returns (step S411), and the process is resumed beginning with the Idelta measurement. If the read head R cannot detect a servo pattern or propagation pattern in step S409 or if servo control cannot be exercised in step S410, the control flow returns to step S402 and continues with the process.

Figure 14:
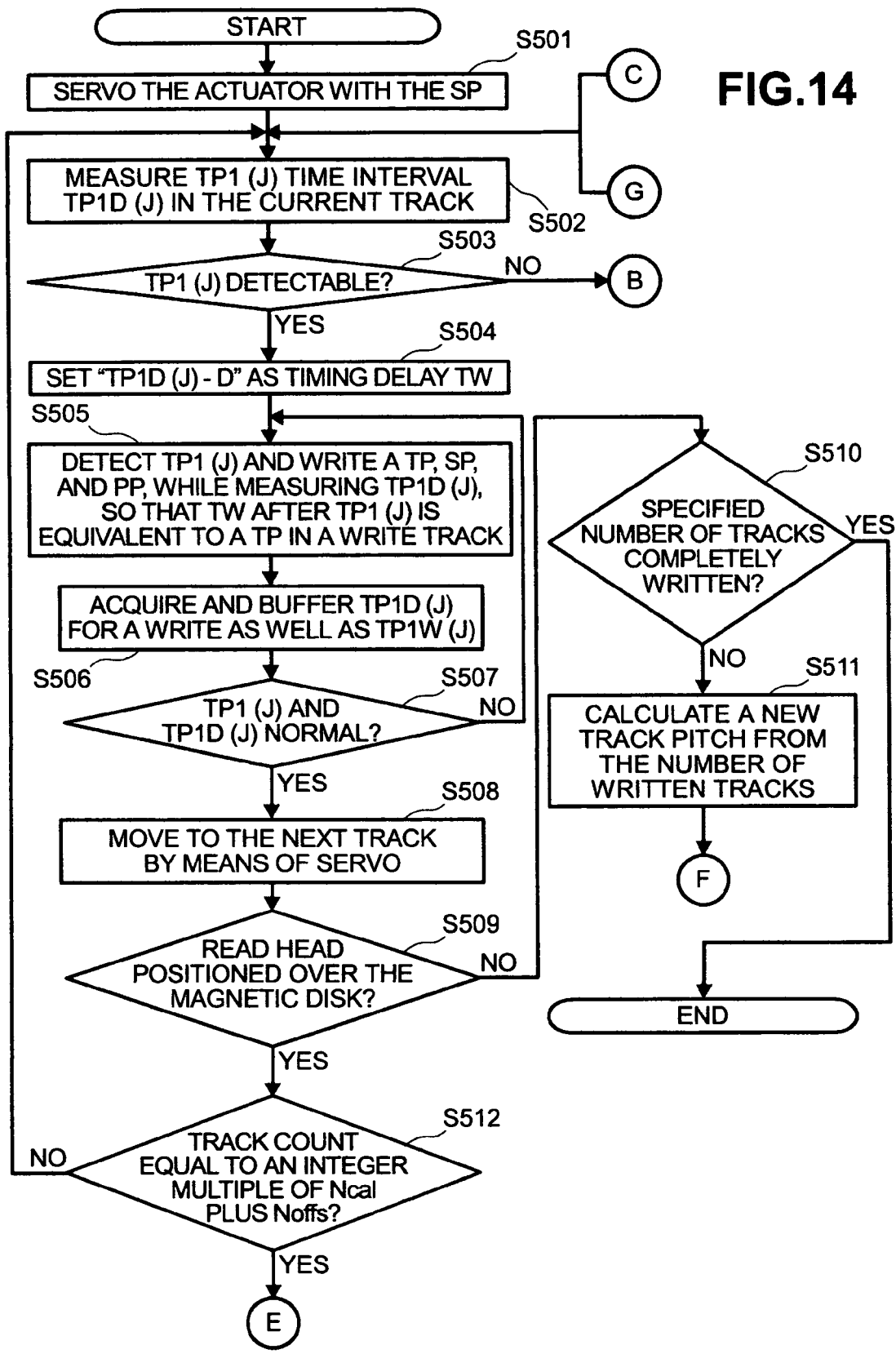
FIG. 14 is a flowchart illustrating a self servo write process that is performed in accordance with servo control.
Figure 15:
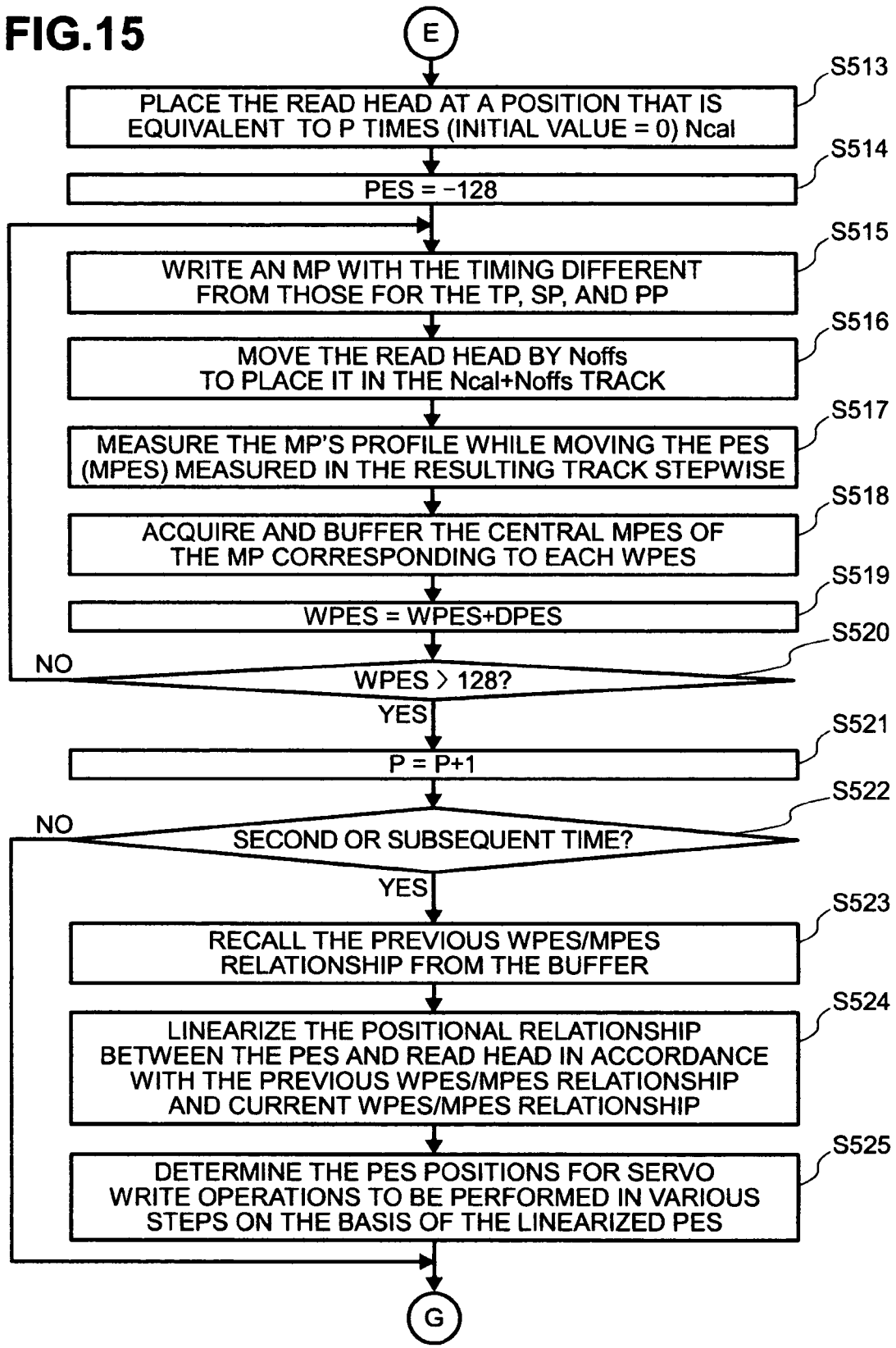
FIG. 15 is a flowchart (continued) illustrating a self servo write process that is performed in accordance with servo control.
Figure 16:
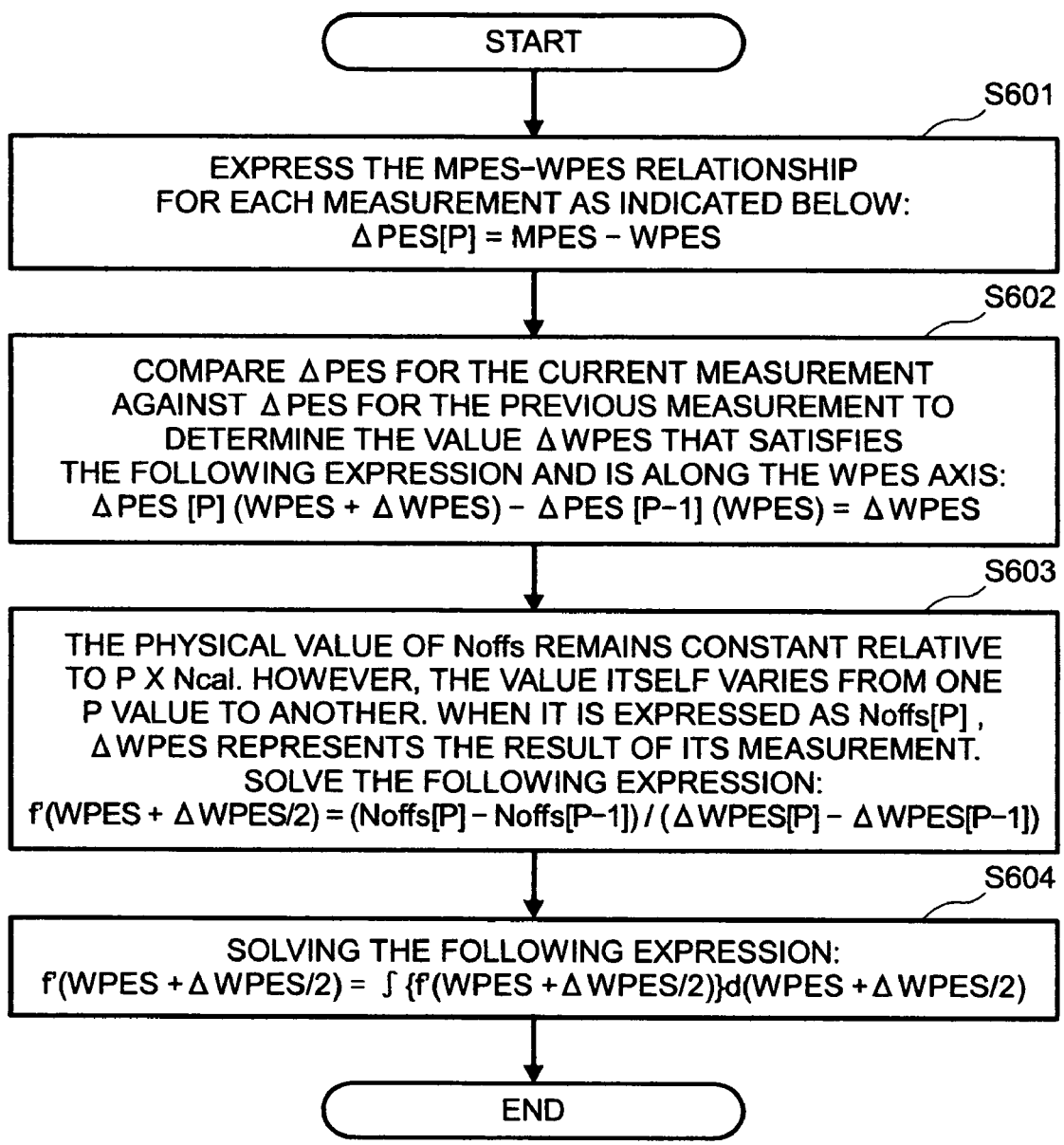
FIG. 16 is a flowchart illustrating the process for linearizing the relationship between the PED and the read head position.

Step S105, that is, the process for writing a trigger pattern, servo pattern, and propagation pattern onto the magnetic disk 2 in accordance with servo control will now be described in detail. FIGS. 14 and 15 are flowcharts illustrating a self servo write process that is performed in accordance with servo control. FIG. 16 shows a state where propagation patterns P0 to P7 are written. For convenience of explanation, step S106 will also be described.

First, the read head R reads a servo pattern that the write head W has already written onto the magnetic disk 2. In accordance with the read servo pattern, the actuator is servoed (step S501). Next, the time interval TP1D (J) between trigger patterns TP1 (J) is measured in the current track (step S502). Step S503 is then performed to check whether TP1 (J) detection can be achieved. If TP (J) detection cannot be achieved, a defective sector is rewritten in the process shown in FIG. 10 and then the control flow returns to step S502. If TP (J) detection is achieved, on the other hand, the time difference TP1D (J)−d, which is the difference between the time interval TP1D (J) between the obtained trigger patterns TP1 (J) and the previously determined time difference d, is set as the timing delay TW (step S504).

Next, trigger patterns TP1 (J) are detected, and while the time interval TP1D (J) between the trigger patterns TP1 (J) is measured, a trigger pattern/servo pattern/propagation pattern write is performed in such a manner that the delay TW after the track pitch TP1 (J) is equivalent to a trigger pattern (TP) in a write track (step S505). The time interval TP1D (J) between trigger patterns TP1 (J) during the above write as well as the write time interval TP1W (J) for the next sector are acquired and then buffered (step S506).

Next, step S507 is performed at the time of a write to check whether the trigger pattern TP1 (J) and the write time interval TP1D (J) for the next sector are normal. If they are not normal, the control flow returns to step S505. If they are normal, on the other hand, the servo moves the magnetic head 4 to the next track (step S508). Step S509 is then performed to check whether the read head R is positioned over the magnetic disk 2. If the read head R is not positioned over the magnetic disk 2, step S510 is performed to check whether a specified number of tracks have been written. If the specified number of tracks have already been written, the whole self servo write process terminates. If, on the other hand, the specified number of tracks have not been written yet, the actual track pitch for the current self servo write is determined from the number of written tracks, then the new track pitch required for writing the specified number of tracks is determined in accordance with the determined actual track pitch (step S511), and a self servo write is performed again from the beginning.

The state in which "the trigger pattern TP1 (J) is normal" is a state where the AMP (J) value of the trigger pattern TP1 (J) is normal and the written pattern is normal so that timing signal detection is achievable. As described earlier, the trigger pattern comprises a periodic signal named "sync" and a fixed signal named "sync mark." The trigger pattern cannot be detected as a trigger even when such a fixed signal portion is locally defective or otherwise faulty.

If the read head R is positioned over the magnetic disk 2 in step S509, step S512 is performed to check whether the number of tracks is equal to an integer multiple of a predetermined integer Ncal plus Noffs. If the number of tracks is not equal to an integer multiple of the predetermined integer Ncal plus Noffs, the control flow returns to step S502 and continues with the process. If, on the other hand, the number of tracks is equal to an integer multiple of the predetermined integer Ncal plus Noffs, calibration is effected next. The value Noffs represents the number of tracks that corresponds to the read/write offset RWoffset. As the integer multiple of the predetermined integer Ncal plus Noffs, for example, a setting of approximately 1000 is selected.

First, the read head R is placed at a position that is equivalent to P times (the initial P value is 0) the integer Ncal (step S513). The PES is then set to −128 and the head is moved to the associated position (step S514). Next, a measurement pattern (MP) is written in an area other than those for a trigger pattern, servo pattern, and propagation pattern with the timing different from those for the trigger pattern, servo pattern, and propagation pattern (step S515). It is assumed that the PES value for writing the above measurement pattern MP is WPES. The read head R is then moved by Noffs (RWoffset) and placed in the Ncal+Noffs track (step S516). The measurement pattern's profile is measured while the PES (MPES) measured in the resulting track is moved stepwise (step S517). The central MPES of the measurement pattern corresponding to each WPES is acquired and then buffered (step S518). Further, step S519 is performed so that WPES=WPES+DPES. The value DPES represents a resolution step necessary for viewing the measurement pattern profile and is an integer of I or greater. Subsequently, step S520 is performed to check whether the value WPES is greater than 128. If the value WPES is not greater than 128, the control flow returns to step S515 and continues with the process. If, on the other hand, the value WPES is greater than 128, step S521 is performed so that P=P+1.

Next, step S522 is performed to check whether the current calculation routine is reached for the second or subsequent time. If the calculation routine is not reached for the second or subsequent time (is reached for the first time), the control flow directly returns to step S502 and continues with the process. If, on the other hand, the calculation routine is reached for the second or subsequent time, the WPES/MPES relationship for the last calculation routine call is recalled from the buffer (step S523). The relationship between the PES and read head R is then linearized in accordance with the previous WPES/MPES relationship and current WPES/MPES relationship (step S524). Further, step S525 is performed on the basis of the linearized PES to determine the PES positions for servo write operations that are performed in various steps before the calculation routine is called next. Then, the control flow returns to step S502.

Step S524 mentioned above, that is, the process for linearizing the relationship between the PES and the read head R will now be described in detail. FIG. 16 is a flowchart illustrating step S524.

First, $\Delta PES[P]$ is used for the "MPES−WPES" value derived from each measurement (step S601). Next, $\Delta PES$ for the current measurement is compared against $\Delta PES$ for the previous measurement to determine the value $\Delta WPES$ that satisfies the following expression and is along the WPES axis (step S602):

$$\Delta PES[P](WPES+\Delta WPES)-\Delta PES[P-1](WPES) = \Delta WPES$$

Here, the physical value of Noffs remains constant relative to P×Ncal. However, the value itself varies from one P value to another. When it is expressed as Noffs[P], $\Delta WPES$ represents the result of its measurement. Therefore, the following expression is solved (step S603):

$$f'(WPES+\Delta WPES/2)=(Noffs[P]-Noffs[P-1])/(\Delta WPES[P]-\Delta WPES[P-1])$$

Then, the derived function of the above expression is determined by solving the following expression (step S604):

$$f(WPES+\Delta WPES/2)=\int [f'(WPES+\Delta WPES/2)]d(WPES+\Delta WPES/2)$$

Thus, both can be linearized.

In the present embodiment, the above process is performed to ensure that the position of the write head W can be identified even within a single burst pattern. It is therefore possible to control the position of the magnetic head 4 (read heard R/write head W) with increased accuracy.

Particularly, if propagation occurs in the radial direction of the magnetic disk 2 while a self servo write is performed using the same PES value at all times, the track pitch varies due to the skew of the actuator 5. It is therefore preferable that the above expressions be used to determine the PES value for each step so as to provide a constant track pitch.

The above method for controlling the position of the magnetic head 4, that is, the control method defining the relationship between the PES and the physical position of the magnetic head 4 can be applied not only to a self servo write process but also to an actual use.

Figure 17:
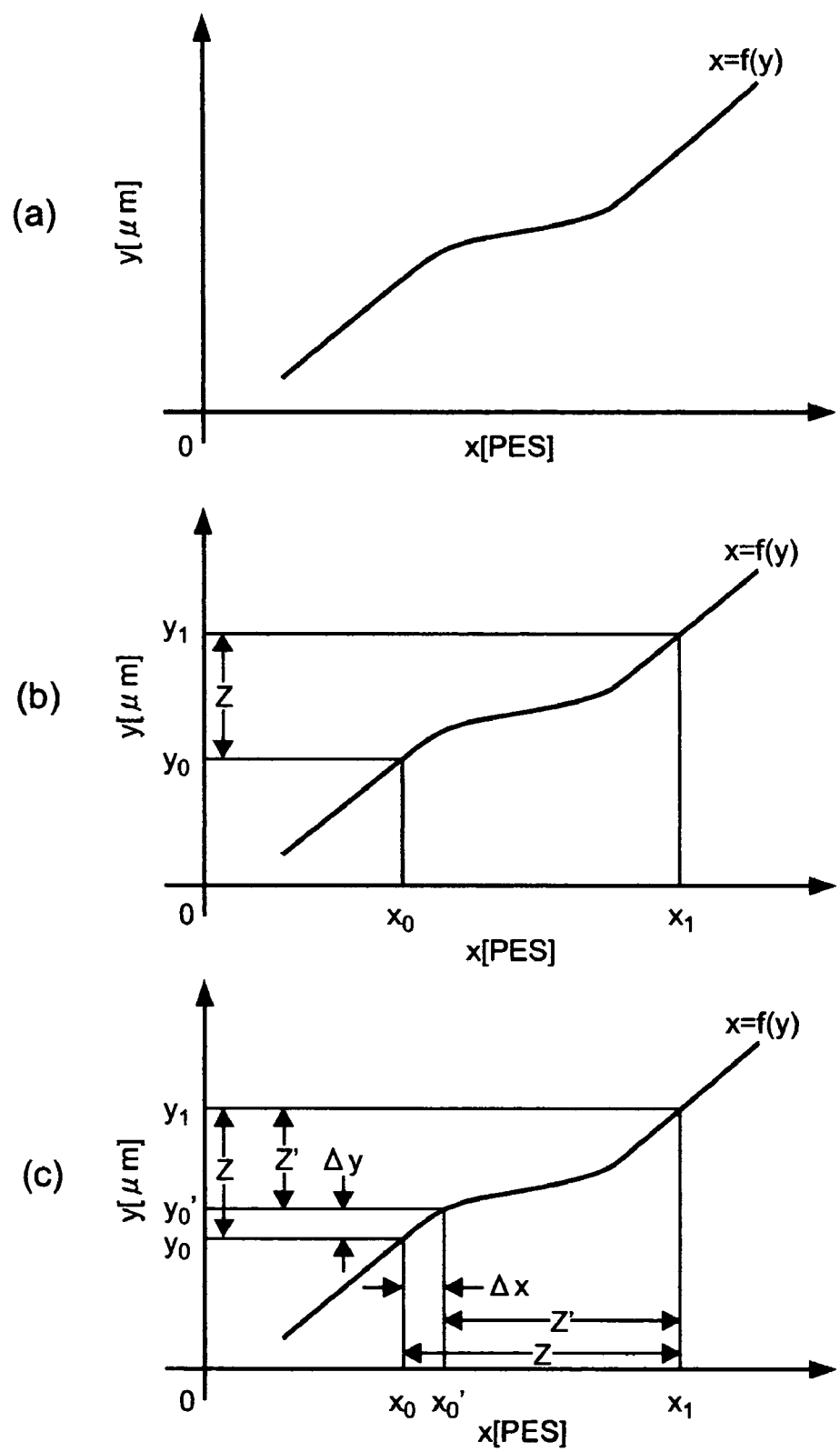
FIGS. 17(a), 17(b), and 17(c) are graphs illustrating the process for linearizing the relationship between the PED and the read head position.

Finally, the relationship between the PES and the read head R will be described in detail. When the physical position of the read head R over the magnetic disk is y (μm) and the resulting magnitude of the PES (position error signal) is x (PES), the relationship between the read head R and the PES is as indicated in FIG. 17(a). More specifically, x and y can be expressed as a function, x=f(y).

In the magnetic head 4 used for the present embodiment, the read head R and the write head W are at different positions so that the read/write offset RWoffset exists. Only the positions of the read head R and write head W within tracks are of interest. Although the read head R and the write head W are actually positioned on different tracks, the distance between the end of a track and the head is examined and it is assumed that the read head R and the write head W are on the same track.

If the result shown in FIG. 17(b) is obtained when the read head R is placed at a certain position $x_1$, the write head W is at position $x_1$. When it is assumed that these two heads are on the same track, the RWoffset value is Z. To determine the position of the write head W, the write head W performs a write while the read head R is at position $x_0$ and then the read head R determines the position at which the information written by the write head W exists.

Within the same track, it can be said that the value Z is adequately constant. However, its measurement result presented below does not indicate that it is constant:

$$z = x_1 - x_0$$

The value z is expressed as a function of x.

The read/write offset RWoffset varies with the radial position over the magnetic disk 2. Therefore, the read/write offset RWoffset is Z' at a different position.

$$\Delta y = Z - Z'$$

When it is assumed that the above expression holds true, it is obvious that Δy is constant because the read/write offset RWoffset is adequately constant within the same track. Meanwhile, Δx, which is the result of PES-based measurement of Δy, is not constant because the expression x=f(y) does not represent a straight line.

Δx can be determined if the positional relationship shown in FIG. 17(c) exists between the r(x) measurement results that are obtained when the read/write offset RWoffset is Z and Z'.

$$f^{-1}(x_0') + R' = f^{-1}(x_0) + R \qquad \text{[Mathematical 1]}$$

That is, when $x_0'$ satisfying the above equation is determined for $x_0$ in accordance with FIG. 17(c), Δx can be determined.

Since a y-axis value cannot be obtained, it is determined using an x-axis value. The value r(x) for R' is determined in the same manner as for r(x). In this instance, $x_0$ and $x_0'$ satisfy the following expression:

$$x_0 + r(x_0) = x_0' + r'(x_0')$$

Figure 18:
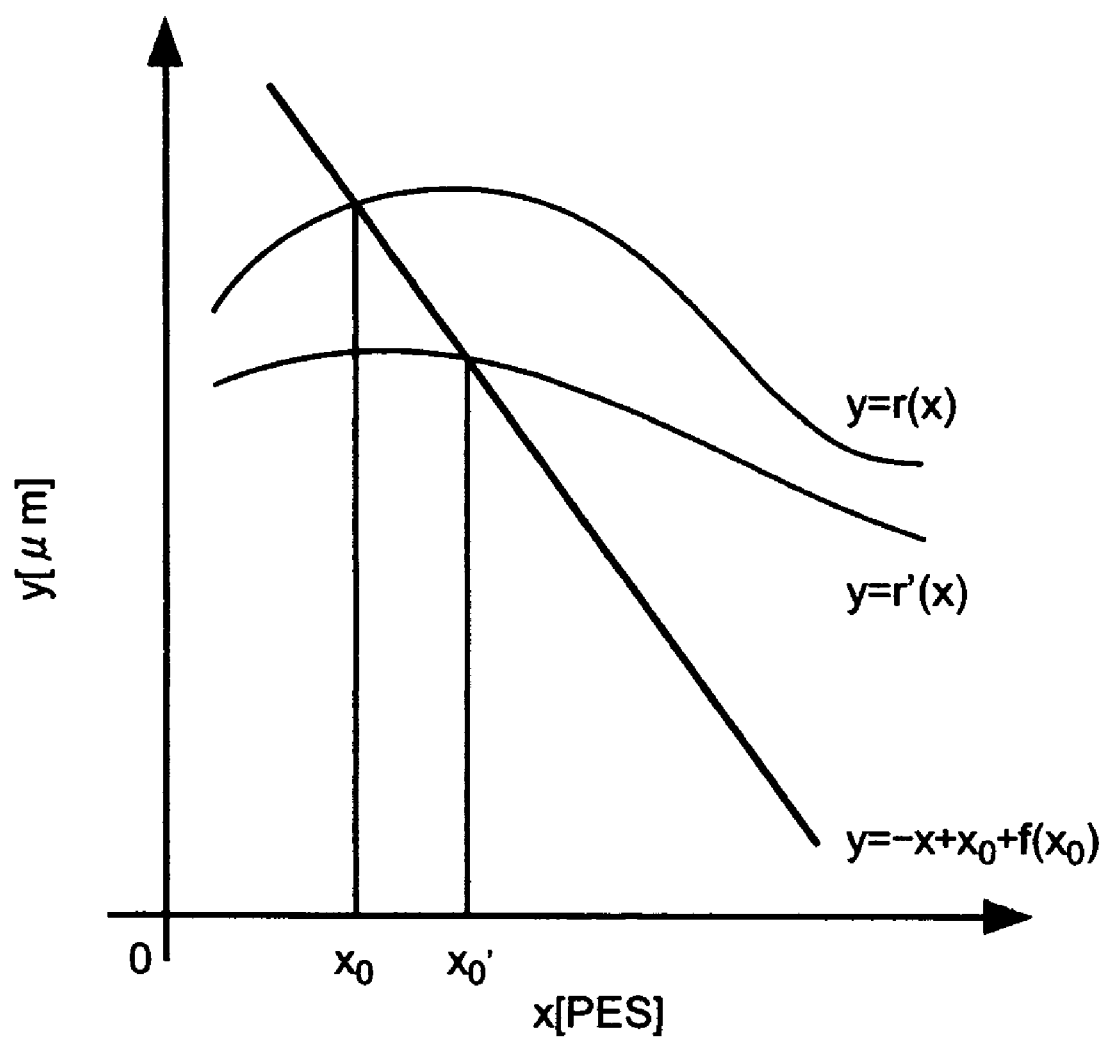
FIG. 18 is a graph (continued) illustrating the process for linearizing the relationship between the PED and the read head position.

FIG. 18 illustrates the above expression.

Thus, the slope of x=f(y) at the current position is determined from the ratio between Δx and Δy.

$$f'(y_0) = (x_0' - x_0)/\Delta y \qquad \text{[Mathematical 2]}$$

Thus, the above difference equation is obtained.

The measurement point furnishes x-axis information only. Therefore, when the above expression is modified to express the function of x, the following is obtained:

$$f'^{-1}(x_0) = \Delta y/(x_0' - x_0) \qquad \text{[Mathematical 3]}$$

When the measurement result is properly processed to express the function of x and integration is performed with respect to x, the target function can be obtained.

As described above, the present invention makes it possible to perform a self servo write by using the hardware of a data storage device when there is no pattern on a disk-type storage medium. Further, the present invention can exercise head position control with enhanced accuracy.

What is claimed is:

1. A servo information write method, comprising:
a first step of positioning an actuator on which a composite head containing a read head and a write head is mounted while said actuator is in contact with a crash stop, and causing the write head to write a servo pattern, a trigger pattern, and a propagation pattern onto a disk-type storage medium, wherein said trigger pattern includes a sync mark;
a second step of, when said servo pattern written on said disk-type storage medium by said write head can be detected by said read head, positioning said write head by means of servo control based on detected said servo pattern and causing said write head to further write a servo pattern and a propagation pattern onto the disk-type storage medium; and
a third step of determining a write time interval between the instant at which said read head detects said trigger pattern written on said disk-type storage medium and the instant at which said write head writes a next trigger pattern onto the disk-type storage medium, wherein said third step causes said read head to detect a time difference between trigger patterns written onto radially adjacent tracks of said disk-type storage medium.

2. The servo information write method according to claim 1, wherein said first step varies the amount of current flow to a drive motor for said actuator while the actuator is in contact with said crash stop.

3. The servo information write method according to claim 1, wherein said second step causes said read head to detect said propagation pattern written on said disk-type storage medium and corrects the position of said write head in accordance with the detected propagation pattern.

4. The servo information write method according to claim 1, further comprising the step of determining a feed pitch for writing a trigger pattern onto said disk-type storage medium.

5. The servo information write method according to claim 1, wherein said write time interval determination step uses a read/write offset which is the distance between said read head and said write head.

6. A servo information write method for writing servo information onto a disk-type storage medium by using a composite head containing a read head and a write head, the servo information write method comprising the steps of:
writing, by said write head, a trigger pattern, a servo pattern, and a propagation pattern onto said disk-type storage medium, wherein said trigger pattern includes a sync pattern;
detecting, by said read head, said servo pattern written on said disk-type storage medium, and positioning said write head at the next write position in accordance with the detected servo pattern; and
determining a write time interval between an instant at which said read head detects said trigger pattern written on said disk-type storage medium and an instant at which said write head writes a next trigger pattern onto the disk-type storage medium, said determining causing the read head to detect a time difference between trigger patterns written onto radially adjacent tracks of said disk-type storage medium.

7. The servo information write method according to claim 6, further comprising the step of detecting, by said read head, said propagation pattern written on said disk-type storage medium, and correcting the position of said write head in accordance with the detected propagation pattern.

8. The servo information write method according to claim 6, wherein said trigger pattern and said servo pattern are to be written in a position information storage area of said disk-type storage medium, and wherein said propagation pattern is to be written in a data storage area of the disk-type storage medium.

9. A servo information write method for writing servo information onto disk-type storage medium by using a composite head containing a read head and a write head, the servo information write method comprising the steps of:
writing, by said write head, a trigger pattern onto said disk-type storage medium; and
determining a write time interval between the instant at which said read head detects said trigger pattern written on said disk-type storage medium and the instant at which said write head writes the next trigger pattern onto the disk-type storage medium, wherein said time interval determination step causes said read head to detect a time difference between trigger patterns written onto radially adjacent tracks of said disk-type storage medium.

10. The servo information write method according to claim 9, wherein said write time interval determination step uses a read/write offset between said read head and said write head.

11. A servo control method for positioning a composite head containing a read head and a write head at a specified position on a disk-type storage medium, the servo control method comprising:
 a first step of detecting, by said read head, a servo pattern written on said disk-type storage medium;
 a second step of converting a position error signal of the detected servo pattern into a physical position on said disk-type storage medium; and
 a third step of determining a write time interval between the instant at which said read head detects a trigger pattern written on said disk-type storage medium and the instant at which said write head writes a next trigger pattern onto the disk-type storage medium, wherein said third step causes said read head to detect a time difference between trigger patterns written onto radially adjacent tracks of said disk-type storage medium.

12. The servo control method according to claim 11, wherein said second step uses a read/write offset which is the distance between said read head and said write head.

13. The servo control method according to claim 11, wherein said second step writes, by said write head, a measurement pattern at a position other than the position for said servo pattern on said disk-type storage medium; detects, by said read head, a profile of said measurement pattern written on said disk-type storage medium; and linearizes the relationship between said position error signal and the position of said read head in accordance with the detected measurement pattern.

14. A data storage device, comprising:
 a first servo write means for positioning an actuator on which a composite head containing a read head and a write head is mounted while said actuator is in contact with a crash stop, and causing the write head to write a servo pattern, a trigger pattern, and a propagation pattern onto a disk-type storage medium, wherein said trigger pattern includes a sync mark;
 a second servo write means for, when said servo pattern written on said disk-type storage medium by said write head can be detected by said read head, positioning said write head by means of servo control based on the detected servo pattern and causing the write head to further write a servo pattern and a propagation pattern onto the disk-type storage medium; and
 a determination means for determining a write time interval between the instant at which said read head detects said trigger pattern written on said disk-type storage medium and the instant at which said write head writes a next trigger pattern onto the disk-type storage medium, wherein said determination means causes said read head to detect a time difference between trigger patterns written onto radially adjacent tracks of said disk-type storage medium.

15. The data storage device according to claim 14, further comprising a correction means for, while said second servo write means is writing a servo pattern and a propagation pattern, causing said read head to detect said propagation pattern written on said disk-type storage medium and correcting the position of said write head in accordance with the detected propagation pattern.

16. A data storage device, comprising:
 a write means for causing a write head to write a trigger pattern onto a disk-type storage medium; and
 a determination means for determining a write time interval between the instant at which said read head detects said trigger pattern written on said disk-type storage medium and the instant at which said write head writes the next trigger pattern onto the disk-type storage medium, said determination means causing said read head to detect a time difference between trigger patterns written onto radially adjacent tracks of said disk-type storage medium.

17. The data storage device according to claim 16, wherein said determination means uses a read/write offset between said read head and said write head.

18. A data storage device, comprising:
 a disk-type storage medium which is positioned in a revolvable manner and provided with a surface storing a servo pattern;
 a read head which is positioned so as to be capable of reading said servo pattern;
 a write head positioned at a predetermined distance from said read head and used to write data onto said disk-type storage medium, wherein said servo pattern is written by said write head;
 a converter for converting a position error signal of said servo pattern read by said read head into a physical position on said disk-type storage medium; and
 a controller for controlling the position of said read head in accordance with the conversion result produced by said converter,
 wherein said data storage device determines a write time interval between the instant at which said read head detects a trigger pattern written on said disk-type storage medium and the instant at which said write head writes a next trigger pattern onto the disk-type storage medium, wherein said read head detects a time difference between trigger patterns written onto radially adjacent tracks of said disk-type storage medium.

19. The data storage device according to claim 18, wherein said read head consists of a magnetoresistive device and said write head consists of a transducer induction device.

20. A program embodied upon a computer-readable medium enabling a computer to exercise a first function for positioning an actuator on which a composite head containing a read head and a write head is mounted while said actuator is in contact with a crash stop and causing the write head to write a servo pattern, a trigger pattern, and a propagation pattern onto a disk-type storage medium, a second function for, when said servo pattern written on said disk-type storage medium by said write head can be detected by said read head, positioning said write head by means of servo control based on the detected servo pattern and causing the write head to further write a servo pattern and a propagation pattern onto the disk-type storage medium, and a third function for determining a write time interval between the instant at which said read head detects said trigger pattern written on said disk-type storage medium and the instant at which said write head writes the next trigger pattern onto the disk-type storage medium, wherein said third function causes said read head to detect a time difference between trigger patterns written onto radially adjacent tracks of said disk-type storage medium.

21. The program according to claim 20, further including a function for determining a feed pitch for writing said trigger pattern onto said disk-type storage medium.

22. A program embodied upon a computer-readable medium enabling a computer to exercise a first function for writing a trigger pattern, a servo pattern, and a propagation pattern onto a disk-type storage medium; a second function for causing said read head to detect said servo pattern written on said disk-type storage medium and positioning said write head at the next write position in accordance with the detected servo pattern, and a third function for determining a write time interval between the instant at which said read head detects said trigger pattern written on said disk-type storage medium and the instant at which said write head writes the next trigger pattern onto the disk-type storage medium, wherein said third function causes said read head to detect a time difference between trigger patterns written onto radially adjacent tracks of said disk-type storage medium.

23. The program according to claim 22, further including a function for causing said read head to detect said propagation pattern written on said disk-type storage medium and correcting the position of said write head.

24. A program embodied upon a computer-readable medium enabling a computer to exercise a function for causing a write head to write a trigger pattern onto a disk-type storage medium and a function for determining a write time interval between the instant at which a read head detects said trigger pattern written on said disk-type storage medium in accordance with the detected propagation pattern and the instant at which said write head writes the next trigger pattern onto the disk-type storage medium, wherein said function for determining causes said read head to detect a time difference between trigger patterns written onto radially adjacent tracks of said disk-type storage medium.

\* \* \* \* \*